United States Patent
Ellingson

(10) Patent No.: US 10,057,269 B1
(45) Date of Patent: Aug. 21, 2018

(54) SYSTEMS AND METHODS FOR DEVICE VERIFICATION AND AUTHENTICATION

(71) Applicant: InfoSci, LLC, Haymarket, VA (US)

(72) Inventor: John Ellingson, Haymarket, VA (US)

(73) Assignee: INFOSCI, LLC, Haymarket, VA (US)

( * ) Notice: Subject to any disclaimer, the term of this patent is extended or adjusted under 35 U.S.C. 154(b) by 0 days.

(21) Appl. No.: 15/493,572

(22) Filed: Apr. 21, 2017

(51) Int. Cl.
- H04L 9/32 (2006.01)
- H04L 29/06 (2006.01)
- G06F 17/30 (2006.01)

(52) U.S. Cl.
CPC ...... *H04L 63/101* (2013.01); *G06F 17/30864* (2013.01); *H04L 63/0428* (2013.01); *H04L 63/08* (2013.01)

(58) Field of Classification Search
CPC ... H04L 63/101; H04L 63/0428; H04L 63/08; G06F 17/30864
See application file for complete search history.

(56) References Cited

U.S. PATENT DOCUMENTS

| | | | |
|---|---|---|---|
| 6,055,637 A | | 4/2000 | Hudson et al. |
| 8,321,670 B2 | | 11/2012 | Lior et al. |
| 2003/0182327 A1 | | 9/2003 | Ramanujam et al. |
| 2004/0172423 A1 | | 9/2004 | Kaasten et al. |
| 2007/0186115 A1 | | 8/2007 | Gao et al. |
| 2008/0313698 A1 | * | 12/2008 | Zhao ........................ H04L 63/08 726/1 |
| 2010/0299308 A1 | | 11/2010 | Prasad et al. |
| 2012/0167169 A1 | * | 6/2012 | Ge .......................... H04L 9/321 726/2 |
| 2012/0243679 A1 | | 9/2012 | Obana |
| 2013/0276092 A1 | | 10/2013 | Sun et al. |
| 2015/0039651 A1 | * | 2/2015 | Kinsely ............. G06F 17/30563 707/779 |

(Continued)

OTHER PUBLICATIONS

Bocek, "Attack on Trust Threat Bulletin: Sony Breach Leaks Private Keys, Leaving Door Open", Venafi Blog, http://www.venafi.com/blog/attack-on-trust-threat-bulletin-sony-breach-leaks, 7 pages, (Jan. 19, 2017).

(Continued)

*Primary Examiner* — Baotran N To
(74) *Attorney, Agent, or Firm* — The Marbury Law Group, PLLC

(57) ABSTRACT

In methods, systems, and computing devices configured to implement methods of authenticating a computing device, a first computing device and a second computing device may share a dynamically updated shared data set. The first computing device may select elements of the shared data set stored at the first computing device and may generate a rule set for extracting the selected elements from the shared data set. The first computing device may send the rule set to the second computing device, and may generate a first result using the selected elements. The second computing device may extract the selected elements from the shared data set using the rule set, may generate a second result, and may send the second result to the first computing device. The first computing device may determine whether the second computing device is authenticated based on whether the first result matches the second result.

16 Claims, 23 Drawing Sheets

(56) References Cited

U.S. PATENT DOCUMENTS

| | | |
|---|---|---|
| 2015/0101037 A1 | 4/2015 | Yang et al. |
| 2016/0063466 A1 | 3/2016 | Sheridan et al. |

OTHER PUBLICATIONS

Cisco, "Dynamic Shared Secrets for the Cisco CMTS Routers", Cisco IOS CMTS Software Configuration Guide, 32 pages, (Feb. 14, 2008).

Juniper Networks, Inc., "Enabling IMS AAA Dynamic Authorization", 5 pages, (1999-2010).

Kwong, et al., "On the Feasibility and Efficacy of Protection Routing in IP Networks", University of Pennsylvania Scholarly Commons, Department of Electrical & Systems Engineering, 11 pages, (Dec. 10, 2009).

IBM Knowledge Center, "RSCS Dynamic Authorization Server Virtual Machine", 2 pages.

Stack Exchange, "What can an attacker do with a stolen SSL private key? What should the web admin do?", Information Security Stack Exchange, 2 pages, (Jan. 19, 2017).

Cnodder et al., "RADIUS Dynamic Authorization Server MIB", Network Working Group, Request for Comments; 4673, 25 pages, (Sep. 2006).

Chiba, et al., "Dynamic Authorization Extensions to Remote Authentication Dial in User Service (RADIUS)" Network Workng Group, Request for Comments: 5176, 35 pages, (Jan. 2008).

RSA, "Global Security Chiefs Over Five Recommendations to Overhaul Outdated Information Security Processes", http://www.rsa.com/en-us/company/newsroom/global-security-chiefs-offer-five-recommendations-to-overhaul, pp. 1-11, (Dec. 10, 2013).

DBIR, "2016 Data Breach Investigations Report—89% of breaches had a financial or espionage motive", Verizon 2016 Data Breach Investigations Report, pp. 1-85, (2016).

Grass, et al., "DRAFT NIST Special Publication 800-63B Digital Authentication Guideline, Authentication and Lifecycle Management", National Institute of Standards and Technology, U.S. Department of Commerce, pp. 1-48, (Nov. 18, 2015).

Wikipedia, "Man-in-the-middle attack", https://en.wikipedia.org/w/index.php?title=Man-in-the-middle_attack&oldid=753645501; 5 pages. (Dec. 8, 2016).

Pansa, et al., "Web Security Improving by using Dynamic Password Authentication", 2011 International Conference on Network and Electronics Engineering, pp. 32-36, (2011).

Amyx, "Managed PKI certificates: One step at a time toward securing the IoT", Unshackle the Internet of Things, TechBeacon, 14 pages, (2016).

Commission on Enhancing National Cybersecurity, "Report on Securing and Growing the Digital Economy", 100 pages, (Dec. 1, 2016).

Wikipedia, "Dynamic SLL", http://en.wikipedia.org/wiki/Dynamic_SLL, Dynamic SSL—Wikipedia. The free encyclopedia, pp. 1-4, (Aug. 25, 2016).

Glover, "PC1 3.1: Stop Using SSL and Outdated TLS Immediately", http://blog.securitymetrics.com/2015/04/pci-3-1-sss-and-tls.html; pp. 1-6, (Aug. 25, 2016).

Dierks, "The Transport Layer Security (TLS) Protocol Version 1.1", Network Working Group, https://tools.ietf.org/html/rfc4346?cm_mc_uid=55413578387314706858380&cm_mc_sid_50200000=1472153170, pp. 1-174, (Apr. 2006).

IBM, "The Secure Sockets Layer and Transport Layer Security", Verification of X.509 Public Key Certificates for Secure Communications, http://www.ibm.com/developerworks/library/ws-ssl-security, pp. 1-48, (Jun. 6, 2012).

RSA, "Two-Factor Authentication is a Must for Mobile", https://blogs.rsa.com/two-factor-authentication-is-a-must-for-mobile, www.rsa.com, pp. 1-7, (Aug. 24, 2016).

Jarmoc, "Transitive Trust and SSL/TLS Interception Proxies, Secure Works", http://www.secureworks.com/research/transitive-trust, pp. 1-21 (Mar. 21, 2012).

Lim, et al., "A Dynamic Key Infrastructure for Grid", Information Security Group, pp. 1-10.

Levi, et al., "An efficient, dynamic and trust preserving public key infrastructure", IEEE.org, IEEE Xplore Digital Library, 3 pages, (Aug. 6, 2002).

Dr. Dobbs, "The Book Cipher Algorithm", http://www.drdobbs.com/security/the-book-cipher-algorithm/210603676, 5 pages, (Sep. 24, 2008).

Meyburgh, "Dynamic Distributed Key Infrastructure DDKI, Tunnel Project with Gatekeeper and KeyVault", A00214314, (COMP 8045 & COMP 8046), 47 pages.

Salem, et al., "The Case for Dynamic Key Distribution for PKI-Based VANETs", International Journal of Computer Networks & Communications (IJCNC), vol. 6. No. 1, 18 pages, (Jan. 2014).

Palo Alto Networks, "Government Endpoint", Use Case, 6 pages.

Wnlabs, "One time pad security", http://www.wnlabs.com/solution.htm, 2 pages, (retrieved Jun. 13, 2017).

Whitenoise, "Unclassified story of Whitenoise Super Key Encryption and Dynamic Identity Verification and Authentication", 9 pages.

Hosseinkhani, et al., "Using image as cipher key in AES", IJCSI International Journal of Computer Science Issues, vol. 9, Issue 2, No. 2, ISSN (Online): 1694-0814, pp. 538-544, (Mar. 2012).

International Search Report from the Korean Intellectual Property Office in International Application No. PCT/US2018/024521 dated Jul. 12, 2018.

* cited by examiner

SYSTEMS AND METHODS FOR DEVICE VERIFICATION AND AUTHENTICATION

BACKGROUND

The development of a digital environment has enabled a vast expansion in rapid communication and information transactions, among other things. However, the security paradigm used in this new environment is ancient: the concept of shared secrets and the concomitant trust. The paradigm of the shared secret has been incorporated into the digital environment in numerous ways—from usernames and passwords, to secure communications between users and systems. For example, this concept is foundational to the Secure Socket Layer, Certificate Authority, Public Key Information security infrastructure.

However, the digital environment is one in which secrets are difficult to keep for more than a short period of time, and once secrecy is lost the formerly secret information may be proliferated rapidly and with complete fidelity. The digital environment is also one in which shared secrets and credentials have become a primary target of "hacking" that has transformed many "secrets" (e.g., passwords, digital certificates, private information and other types of authentication data) into a commodity freely traded on the gray and black markets, destroying the benefit of such secrets for securing digital exchanges. Yet, the underlying security mechanism of the digital environment remains dependent upon the safe operation of this false assumption that the secret is still secret.

Verification of the presented identity of a computing device is a critical aspect of numerous electronic communications. However, the vulnerability of shared secrets, as well as the vulnerability of communications in transmission, dramatically undermines the reliability and security of digital certificates or other similar information for trusted device identity verification.

SUMMARY

Various embodiments include methods of dynamically altering a data set that is shared between a first computing device and a second computing device. Various embodiments may include determining whether a data set update trigger has occurred, generating an instruction to alter the shared data set in response to determining that the data set update trigger has occurred, altering the shared data set stored in the memory according to the generated instruction, and sending the generated instruction to a second computing device to alter the shared data set at the second computing device according to the generated instruction.

In some embodiments, generating an instruction to alter the shared data set in response to determining that the data set update trigger has occurred may include generating an instruction to add a new portion to the shared data set based on data inputs received at the first computing device. In some embodiments, generating an instruction to alter the shared data set in response to determining that the data set update trigger has occurred may include generating an instruction to subtract a portion of the shared data set. In some embodiments, generating an instruction to alter the shared data set in response to determining that the data set update trigger has occurred may include generating an instruction to re-order the shared data set. In some embodiments, generating an instruction to alter the shared data set in response to determining that the data set update trigger has occurred may include generating an instruction to transform the shared data set.

In some embodiments, the method may further include selecting elements from the shared data set stored in the memory, generating a rule set for extracting the selected elements from the shared data set, and sending the rule set to the second computing device. In such embodiments the method may further include transforming the selected elements to generate a first result, receiving from the second computing device a second result based on the rule set, determining whether the first result matches the second result, and determining whether the second computing device is authenticated based on whether the first result matches the second result.

Various embodiments include methods of authenticating computing devices. Various embodiments may include selecting, by a processor of a first computing device, elements from a shared data set stored at the first computing device, wherein the shared data set is also stored at the second computing device, generating, by the processor of the first computing device, a rule set for extracting the selected elements from the shared data set, transforming, by the processor of the first computing device, the selected elements to generate a first result, and sending, by the processor of the first computing device, the rule set to the second computing device. Various embodiments may include receiving, by a processor of the second computing device, the rule set from the first computing device, extracting, by the processor of the second computing device, the selected elements from the shared data set stored at the second computing device using the rule set, transforming, by the processor of the second computing device, the extracted elements to generate a second result, and sending, by the processor of the second computing device, the generated second result to the first computing device;

Various embodiments may include determining, by the processor of the first computing device, whether the first result matches the second result, and determining, by the processor of the first computing device, whether the second computing device is authenticated based on whether the first result matches the second result.

In some embodiments, generating the rule set for extracting the selected elements from the shared data set may be performed prior to the selecting elements from the shared data set. Some embodiments may further include sending, by the processor of the first computing device to the second computing device, an indication of whether the second computing device is authenticated based on whether the first result matches the second result.

In some embodiments, selecting, by the processor of the first computing device, elements from the shared data set stored at the first computing device, wherein the shared data set is further stored at the second computing device may include selecting, by the processor of the first computing device, one or more portions of the shared data set, and selecting, by the processor of the first computing device, two or more elements from among the one or more portions of the shared data set.

In some embodiments, selecting, by the processor of the first computing device, elements from the shared data set stored at the first computing device, wherein the shared data set is further stored at the second computing device may include selecting one of the two or more elements as a primary element.

In some embodiments, generating, by the processor of the first computing device, a rule set for extracting the selected elements from the shared data set may further include determining, by the processor of the first computing device, one or more relationships between the selected two or more elements, and generating, by the processor of the first computing device, the rule set based on the determined one or more relationships between the selected two or more elements.

In some embodiments, extracting, by the processor of the first computing device, the selected elements from the shared data set stored at the second computing device using the rule set may include identifying, by the processor of the first computing device, one or more elements of the shared data set indicated in the rule set, identifying, by the processor of the first computing device, one or more relationships between the selected two or more elements indicated in the rule set, and extracting, by the processor of the first computing device, the one or more elements from the shared data set using the identified one or more elements and the one or more relationships. In some embodiments, the shared data set may include one or more transitory identities.

Various embodiments further include computing devices configured with processor-executable instructions to perform operations of the methods summarized above. Various embodiments further include a system including a first computing device and a second computing device, each configured to perform operations of the methods summarized above.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

Figure 1A:
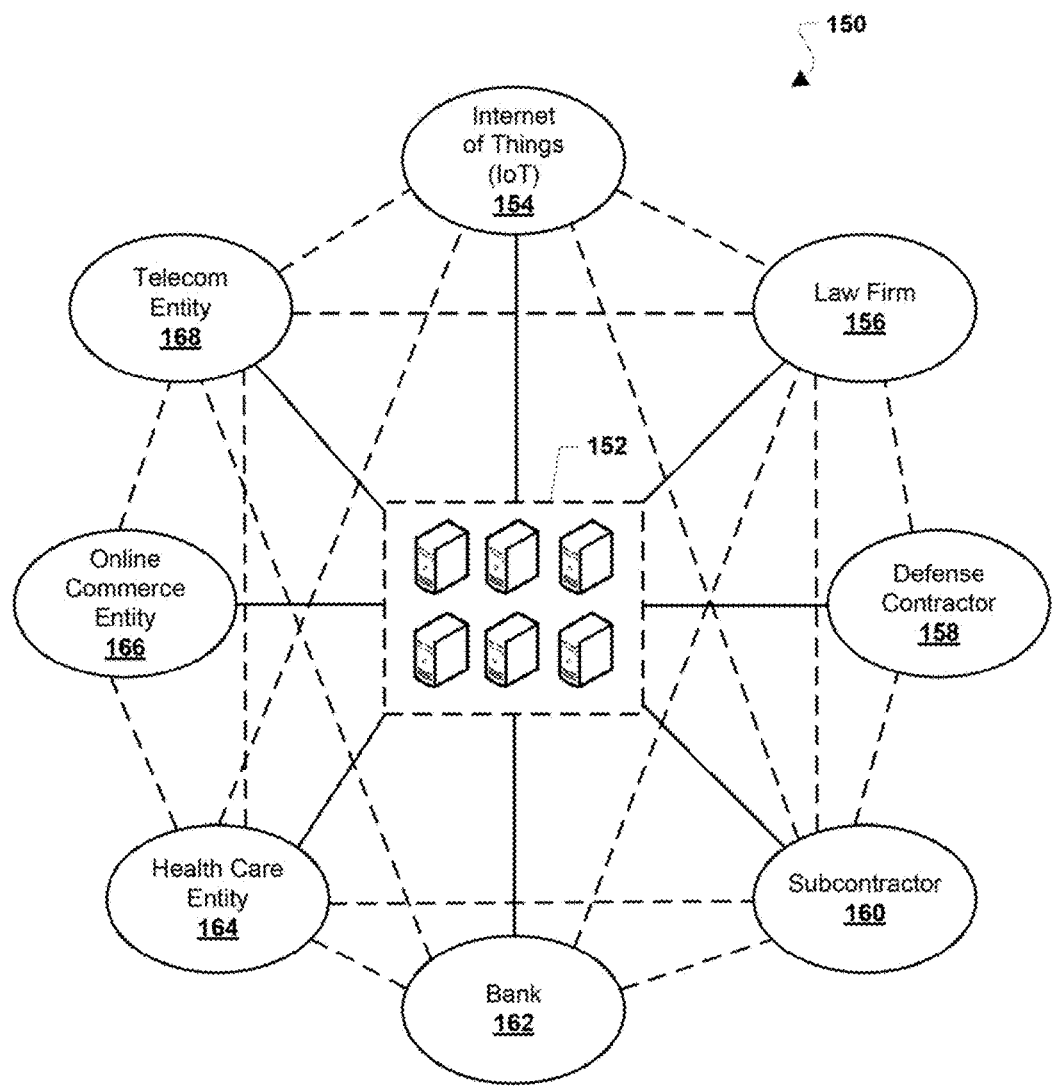
FIGS. 1A-1C are component block diagrams of a communication system suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments provide methods, and computing devices (or other digital or programmable devices) configured to implement the methods, that enable authenticating of a computing device to other computing devices in a communication system based on dynamic information associated with a computing device that does not rely on the paradigm of shared secrets and static information.

Because the transitory identity of each computing device is periodically or aperiodically changing, and each computing device is in periodic or aperiodic communication with other computing devices (synchronously or asynchronously) sending and/or receiving new transitory identities, various embodiments improve the security function of any communication network or any electronic communication system by improving the security of communications. Various embodiments also improve the security function of any communication network by reliably authenticating the identity of a participating computing device without relying on easily compromised static identification information, such as a shared secret, that may be vulnerable to attack by access and/or copying.

The term "computing device" refers to any programmable computer or processor that can be configured with programmable instructions to perform various embodiment methods. A computing device may include one or all of personal computers, laptop computers, tablet computers, cellular telephones, smartphones, Internet enabled cellular telephones, Wi-Fi enabled electronic devices, personal data assistants (PDAs), wearable computing devices (including smart watches, necklaces, medallions, and any computing device configured to be worn, attached to a wearable item, or embedded in a wearable item), wireless accessory devices, memory sticks, dongles, wireless peripheral devices, Internet of Things (IoT) devices, network elements such as servers, routers, gateways, and the like (including so-called "cloud" computing devices), and similar electronic devices equipped with a short-range radio (e.g., a Bluetooth, Peanut, ZigBee, and/or Wi-Fi radio, etc.) and/or a wide area network connection (e.g., using one or more cellular radio access technologies to communicate using a wireless wide area network transceiver, or a wired connection to a communication network).

As used herein, the term "information transaction" refers to any communication or other exchange of information in which the identity of the participating devices may be authenticated. In some embodiments, the methods and computing devices configured to implement the methods described herein may be implemented in a variety of contexts in which the identity of the participating devices may be authenticated, such as health care record management, secure communications (e.g., government, business, intelligence community, etc.), public records management systems, voting systems, financial services systems, security brokerage systems, and many others. In some embodiments, the methods and computing devices configured to implement the methods described herein may be implemented in IoT devices, or among IoT devices and an IoT device controller, such as a router, server, IoT hub, or another similar device. In particular, various embodiments, when implemented in an IoT environment, may be of particular use in preventing distributed denial of service (DDoS) attacks, without human intervention. In some embodiments, the methods and computing devices configured to implement the methods described herein may be implemented in autonomous vehicles, semiautonomous vehicles, and remotely directed vehicles. In some embodiments, the methods and computing devices configured to implement the methods described herein may authenticate the participation of a computing device in an information transaction. In some embodiments, the methods and computing devices configured to implement the methods described herein may be implemented in the context of a commercial transaction, to enable performance of a non-repudiable commercial transaction in which, because the participation of specific computing devices may be authenticated, a participant may be unable to later deny participation in the transaction (such as, for example, a card-not-present financial transaction).

The terms "component," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, an object, an executable, a thread of execution, a program, and/or a computer. By way of illustration, both an application running on a wireless device and the wireless device itself may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Among other things, the digital environment enables rapid communication and information transactions on up to a global scale. However, the current digital environment rests on a shaky security foundation: the old paradigm of the static shared secret. There are numerous fundamental differences between the purely human environment we operated in for thousands of years until the late 20th century and the digital environment we operate in today.

Further, the digital environment is one in which secrets are difficult to keep over time. Once secrecy is lost the formerly secret information may be proliferated rapidly and with complete fidelity and used by an attackers. Breakdowns in digital system security, resulting in massive data breaches, have become nearly commonplace and the frequency of their occurrence has accelerated.

Indeed, the emergence of the cyber security industry is indicative of the endemic failure of security in general throughout the digital environment. As but one example, cybercrimes such as identity fraud are among the fastest growing crimes, with threats continuing to accelerate in capability and scale. The proliferation of network-connected devices, including smart phones, wearable computers, gaming systems, Internet of Things devices, and the like is exacerbating the scale and extent of digital security risks. For example, many of these devices are either themselves untrustworthy or are interacting with untrustworthy mobile networks, and few such devices have the computing power to perform traditional security functions of familiar desktops and laptops.

In the majority of the breach incidents, a violation of trust or the misuse of a shared secret (e.g., a credential) is at the root of the failure. While in certain cases a particular security failure may be due to a lack of strength in the technology employed to provide the trust and security, in general security failures in the digital environment have occurred in a wide variety of industries using a variety of technology deployments. Security failures occur across the board and are attributable not only to any particular deployed technology, but also to the practices and procedures inherent to its application and use. Thus, security failures in the digital environment are due to something more fundamental and endemic in the root strategy of the trust paradigm of the shared secret that has failed.

The current paradigm of digital security fails for at least three fundamental reasons: (1) the current paradigm is based on trust, and trust is what fails; (2) the current paradigm is based on stable or static shared secrets, but the secrets do not remain secret, and are as useful to an attacker as to an authorized user; and (3) the vast majority of information transactions are between anonymous parties. Thus, "trusted systems" ultimately do not work because they are penetrable and vulnerable. Moreover, current "trusted systems" are vulnerable to penetration and exploitation in large part due to the use of static or durable information that does not vary with time (or duration); and failures of policy and human factors (e.g., social engineering, negligence, etc.).

Further, the verification of a computing device's purported identity is a critical aspect of numerous electronic communications. However, the vulnerability of shared secrets, as well as the vulnerability of communications in transmission, dramatically undermines the reliability of digital certificates or other similar information for reliable device identity verification.

Various embodiments disclosed in this application address the security vulnerability of digital systems and provide electronic security for device-to-device communication as well as for enhanced user authentication. Various embodiments provide computer-implemented methods to provide for continuous refreshing and changing of digital certificates. Various embodiments incorporate the assumption that trusted systems ultimately are demonstrably insecure, because such systems are penetrable and vulnerable. Various embodiments provide a digital communication system that assumes no trust among various network elements, for at least the reason that the digital environment is inherently untrustworthy. The emergence of the field of cybersecurity is a response to this endemic failure.

Various embodiments change the way devices are authenticated on networks by generating and sharing authenticating information of such limited duration that it cannot be effectively used by an attacker. The common threat vector is typically theft of the authenticating information, rather than use of computing power to decrypt encoded authenticating information. In various embodiments, the duration during which the authenticating information may be used may be relatively short, such as a duration of minutes. This contrast with the effective duration of certificates from a conventional certifying authority (CA), which may have a duration of up to decades in some cases. In some embodiments, the duration of the authenticating information may be determined to be shorter than the time it takes an attacker to obtain and exploit the information. Various embodiments are based on the assumption that the authenticating information is potentially vulnerable and may be obtained by an attacker, and the validity duration of the authenticating information may be determined such that its usefulness for authentication expires before an adversary can discover and exploit it. For example, based on state of the art computing capabilities, an amount of time required to decrypt a commonly used encryption hash (e.g., MD5, SHA2, etc.) using brute force may be determined. In various embodiments, the validity duration of authentication information may change as advancements in computing technologies reduce the time required to discover and decrypt such information. In some embodiments, the system may determine a validity duration for authenticating information that is shorter than the determined time required to decrypt the encrypted information.

The relatively short useful duration of the authenticating information reduces by orders of magnitude the possibility of such authenticating information being guessed, accessed or "hacked" and then used as a means of attacking the system. Using such authenticating information enables the system to authorize only desired devices and to deny access to unauthorized devices, even when such unauthorized devices present previously-acceptable username and passwords, certificates or other access credentials. Thus, various embodiments further enable existing security technologies and components to preclude access to a device or system by attackers who have obtained perfect copies of legitimate user login credentials. Various embodiments may be applied in other security applications utilizing one-time passwords, such as cloud security, as well as on a wide range of devices, including Internet of Things (IoT) devices. Various embodiments may be applied to authenticate communications among a variety of devices, such as computing devices that may be targets of attack or subordination for recruitment in the performance of a distributed denial of service (DDoS) attack.

In various embodiments, computing devices perform a bi-directional, three-way authentication in which each computing device periodically (or aperiodically) generates an ephemeral "transitory identity" using dynamic and/or static state aspects (alone or in combination) of the computing device. The transitory identities generated by each computing device may be exchanged and authenticated by two (or more) other computing devices. Transitory identities may be used with existing security methodologies, including hashing techniques, updated keystones, updated Trust Anchors, Client Certificate Mapping, Active Directory, Internet Information Services (IIS) Client Certificate Mapping, digital certificates, a trusted third-party, and other security mechanisms. Various embodiments may defeat attempts to impersonate an authorized computing device, such as an attempt to login to a computer network or online environment by an unauthorized user possessing the credentials of an authorized user. Various embodiments may also provide secure communications between digital devices of any kind on any network. Thus, various embodiments may provide secure, creditable and authenticated communication between computing devices on a communication network that eliminates the common vulnerabilities of conventional authentication technologies.

In various embodiments, a transitory identity may be generated dynamically, such as based at least in part on one or more changing or dynamic states of the computing device that generates the transitory identity, or dynamic information obtained by a sensor within the computing device (e.g., a camera, microphone, accelerometer, etc.). In some embodiments, a computing device may generate its own transitory identity. In some embodiments, another computing device, such as an authentication server, may generate the transitory identity for the computing device, and the transitory identify may be pushed to the computing device, pulled from the server by the computing device, or acquired from another source (e.g., over a communication network).

In some embodiments, a given transitory identity may be used only once. In such embodiments, a transitory identity that has been used may thereafter be unusable.

In various embodiments, time is a critical element of transitory identities. For example, the expiration of a transitory identity may be limited to a reasonable length of time that a secret can be expected to be kept. In various embodiments, the computing device may determine a time bound or time duration of a transitory identity such that the transitory identity is useful for a length of time that is shorter than a time required for an attacker to guess or acquire the transitory identity and use it in a successful attack, such as access to a secure network or completion of a secured transaction. Beyond the time bound or time duration, the transitory identity may be unusable for authentication of any computing device. The duration of a transitory identity may be shorter than the duration of a given communication session (e.g., a VPN session or an Internet shopping and purchase session). In such situations, a new transitory identity may be generated for the computing device during the communication session and used in securing data exchanges within the communication session after expiration of the old transitory identity.

In some embodiments, the dynamic aspects of the generating computing device used in generating transitory identities will change frequently or continuously so that each transitory identity is based on different (i.e., changed) data. In such embodiments, each generated transitory identity may include unique data (that may be represented by a string of data) that represents a "snapshot" of a dynamic state of the generating computing device at the time that the transitory identity is generated. Various embodiments use the unique data (or unique data string) generated by reference to one or more constantly changing conditions as a basis for generating a unique dynamic certificate. As a result, it is extremely difficult for an attacker to discover the basis for generating transitory identities in an attempt to generate counterfeit identities.

In some embodiments, computing devices may exchange information or otherwise negotiate a timing of when each computing device may generate a new transitory identity. In some embodiments, a computing device (e.g., a server) may instruct another computing device (e.g., a user device) to generate a new transitory identity. Such coordination of generating new transitory identities may enable frequent changes in transitory identities during an extended digital communication session.

In some embodiments, a computing device may include a module, such as a transitory identity module, that may store a small unit of static information. The information may include text, an image, biometric information, and the like. In some embodiments, a computing device may combine dynamic information with the static information to generate the transitory identity. By adding dynamic information to static information, an entire string information may be changed by altering a small element. Further, a hash of the combined dynamic information and static information will be different from a hash of the static information alone, without requiring alteration of the entire data set.

In some embodiments, each computing device participating in a communication system may generate a transitory identity. Each participating communication device may send its generated transitory identity to an authentication server, which may function as a repository of the real-time generated transitory identities. For example, two endpoint computing devices (e.g., a first computing device and a second computing device) may each generate transitory identities, and may each send their generated transitory identity to the other computing device and to an authentication server (e.g., a third computing device). In some embodiments, the first computing device may send a query to the authentication server that includes the transitory identity that the first computing device received from the second computing device, requesting that the authentication server authenticate the transitory identity of the second computing device. The third computing device may compare the second computing device's transitory identities received from both the second computing device and the first computing device. In response to determining that the transitory identities match, the third computing device may send to the first computing device an indication of authentication success of the second computing device. In some embodiments, the indication of authentication success may be transmitted by the third computing device using methods configured to defeat man-in-the-middle attacks. In various embodiments, the third computing device may function as a repository in a variety of applications, including, but not limited to financial services systems, security brokerage systems, healthcare record management systems, secure communication systems for business, government, intelligence community, etc., public records systems (e.g., firearm registries, Departments of Motor Vehicles, etc.), voting systems, and among Internet of Things devices.

In response to determining that the transitory identities do not match, the third computing device may send to the first computing device an indication of authentication failure of the second computing device. In some embodiments, the indication of authentication failure may be transmitted by the third computing device using methods configured to defeat man-in-the-middle attacks.

In some embodiments, the authentication server (the third computing device) may also generate a transitory identity and send the third computing device transitory identity to the first and second computing devices, and the first and second computing devices may compare the third computing device transitory identity and authenticate for themselves the identity of the third computing device.

In some embodiments, the third computing device, together with its transitory identity or separate from its transitory identity, may send an instruction to other computing devices (e.g., the first and second computing devices) to generate a new transitory identity. In various embodiments, each computing device participating in the communication system may periodically or aperiodically generate a new transitory identity. During an ongoing communication session, such new transitory identities may be generated sufficiently before the expiration of one or more current transitory identities securing the communication session to enable the two computing devices and the third computing device to complete the exchanges and authentications of the new transitory identities so that the communication session can continue uninterrupted and secured by the new identities. In some embodiments, each new transitory identity may be set for single use, such that each computing device that receives a transitory identity from another computing device may only use (interact with, authenticate, process, hash, etc.) a transitory identity once, after which the received transitory identity becomes unusable. Again, a lifetime may be set for each new transitory identity for a time duration that is less than a period of time in which an attacker may obtain and use the transitory identity.

Various embodiments may operate to quickly restore security after a successful attack. In various embodiments, a successful attack on the authentication server or another device participating in the system will not compromise system security for any significant period of time, since any exfiltrated credential information is of no lasting value to the attacker, as it will all expire before it can be exploited. Thus, the authentication system may not be compromised by attacking the authentication server. Various embodiments provide a communication system that is durable and sustainable and that operates successfully in an environment in which any and every component is likely to be successfully attacked and compromised.

In some embodiments, a first computing device and a second computing device may establish a trusted relationship based on a previously-shared data hash (e.g., using a hashing algorithm such as MD5, SHA1, or SHA2). The previously-shared data hash may be created, for example, from a stored and shared time-based one-time password algorithm (e.g., Internet Engineering Task Force RFC 6238, Temporary One-Time Password (TOTP), etc.). Such a previously-shared data hash may be stored in memory on the first computing device and/or the second computing device. In some embodiments, the second computing device may initiate a session, such as an information transaction session or communication session, when the second computing device receives from the first computing device login data, such as a username and password, that may be associated with an account or session identifier. In such embodiments, while the login data may be used to identify the account or the session, the login data may not be used for purposes of communication security or authentication of any computing device or user.

In some embodiments, the first computing device may generate a transitory identity and send the transitory identity to the second device together with the login data, or separately from the login data. The first computing device may generate the transitory identity based on dynamic and/or static aspects of or determined by the first computing device. In some embodiments, dynamic aspects of the first computing device may include aspects of the first computing device that change relatively rapidly, such as a clock time, a chip state, a register state, information received or detected by a sensor of the computing device (e.g., an accelerometer, optical sensor, temperature, humidity, and the like), location information from a Global Positioning System (GPS) device or a Wi-Fi signal, or any other source of data based on a dynamic aspect of the first computing device. In some embodiments, dynamic aspects determined the first computing device may include an image or video clip captured by a camera, a sound clip of ambient sounds captured by a microphone, an audio video clip captured by a camera and microphone, or any other information regarding a surroundings or ambient conditions of the first computing device. In some embodiments, dynamic aspects may be obtained from other sources that are random and frequently changing, such as external sensors and external sources of random information.

The second computing device may send an authentication query to a third computing device, which may function as an authentication server or certificate authority.

In some embodiments, the authentication query may include the transitory identity generated by the first computing device. In some embodiments, the authentication server may store the first computing device's transitory identity.

Based on the authentication query from the second computing device, the third computing device may send an authentication query to the first computing device. Responsive to the authentication query from the third computing device, the first computing device may send first computing device's transitory identity to the third computing device. In some embodiments, the first computing device may generate a hash of the first computing device transitory identity, and may send the generated hash of the first computing device's transitory identity to the third computing device.

In some embodiments, the third computing device may compare the first computing device's transitory identity received from the second computing device and the first computing device's transitory identity received from the first computing device. In response to determining that the two received transitory identities match, the third computing device may send an indication of authentication success of the first computing device to the second computing device. In response to determining that the two received transitory identities do not match, the third computing device may send an indication of first computing device authentication failure to the second computing device.

In some embodiments, the third computing device (e.g., the authentication server) may maintain an audit trail of successful and failed login attempts. In some embodiments, the audit trail may include metadata identifying, for example, a time of each attempt, identifiers of the first and second computing devices (and any other participating computing devices), a frequency of use, a frequency of authentication failures, and other details. The audit trail may be used for risk analysis, and may be displayed and/or accessible via a dashboard or other reporting mechanism. In various embodiments, any of the participating computing devices may keep an audit trail. In some embodiments, copies of transitory identities may be stored as part of the audit trail. Such stored transitory identities may not be used for authentication purposes, but may be used to identify participating computing devices, as well as to confirm the participation in a particular information transaction by a particular computing device. In some embodiments, the information stored in the audit trail may be used to identify, for example, a computing device that has been targeted for attack in some manner.

Various embodiments provide a system that may authenticate the identity of the computing device in a communication system based on transitory and/or dynamic information of each computing device, in contrast to the current paradigm of shared secrets and static information. In various embodiments, a participating computing device may authenticate the identity of a second computing device using an ephemeral transitory identity that may be received from the second computing device and from a third computing device (e.g., an authentication server). The various embodiments stand in contrast to the current security paradigm, which is based on keeping secret a static unit of information, such as a static certificate. Because the transitory identity of each computing device is frequently changing, and each computing device is in periodic (or aperiodic) communication with other computing devices sending and/or receiving new transitory identities, various embodiments improve the function of any communication network or any electronic communication system by improving the security of communications. An adversary would be required to penetrate (at a minimum) three communication pathways—e.g., between the first and second computing devices, between the first and third computing devices, and between the second and third computing devices—simultaneously and synchronously in order to compromise communications between any two of the communication devices.

Various embodiments may be implemented using a variety of computing devices and/or communication networks or systems without requiring substantive changes or alterations of any presently-existing infrastructure. Various embodiments also improve the function of any communication network by reliably authenticating the identity of a participating computing device without relying on static identification information, such as a shared secret, that could be vulnerable to attack by access and/or copying.

In various embodiments, a computing device that is configured to perform the various methods may be deauthorized or blocked from accessing the system in the event of theft or cloning of the computing device.

Further details relevant to various embodiments are disclosed in U.S. Provisional Application No. 62/423,593 entitled "Systems and Methods for Multipath Authentication" filed Nov. 17, 2016, and U.S. patent application Ser. No. 15/395,336 filed Dec. 30, 2016, both of which are incorporated by reference herein in their entirety.

Various embodiments include systems and methods for multipath dynamic authentication for two or more computing devices. Various embodiments enhance and improve the verification of computing devices on a communication network by utilizing a dynamically changing shared information context. The information context may include, for example, a dynamically changing shared data set. In some embodiments, two computing devices may compile a shared data set over time, for example, by storing copies of transitory identities as described above. In some embodiments, the data set may be built up over time using any type of data files or data elements. In various embodiments, the two computing devices may include any two endpoint devices in a computing network, such as a user device, a network server, an authentication server, or another computing device. The shared data set may be compiled over time, and may be changed by a computing device occasionally, periodically, and/or upon the occurrence of a triggering event.

Changing or altering the shared data set may include reordering one or more portions of the data set, adding information to the data set, subtracting information from the data set, and/or transforming one or more portions of the shared data set.

The shared data set may include two or more portions. Each portion of the data set may include two or more elements. In some embodiments, a computing device may determine a relationship between two or more elements of a shared data set. The relationship between the two or more elements may include a comparative difference between the two or more elements, such as a time difference, a location difference, a positional difference, a color difference, a pitch difference, a frequency difference, or another difference. The relationship between the two or more elements may also include a comparative difference between each of the two or more elements and a third element, such as a relative time, location, position, color, pitch, frequency, or another difference.

In some embodiments, the shared data set may include a referential dynamic contextual database (RDCBD), which is a dynamically altered complex shared data set that may contain a plurality of files. In some embodiments, the plurality of files may include a plurality of image files. In various embodiments, the computing devices may use an agreed upon method for altering the RDCBD so that the RDCBD changes over time that enables both computing devices to alter the RDCBD while maintaining an identical shared data set. In some embodiments, the method for altering the shared data set may be agreed to by the computing devices in advance. In some embodiments, the method for altering the shared data set may be agreed to dynamically by the computing devices (e.g., "on the fly").

In some embodiments, one or more of the computing devices may generate and send to one or more other computing devices a rule set that may be used to authenticate each user device for secure communications. The rule set may identify selected elements from the shared data set. In some embodiments, the computing device may generate the rule set based on one or more relationships between or among the selected elements of the shared data set.

In some embodiments, one or more of the computing devices may generate and send to one or more other computing devices a rule set that may be used to authenticate each user device for secure communications. In some embodiments, a first computing device may select data from the shared data set. The selected data may include two or more elements from among one or more portions of the shared data set. The first computing device may determine one or more relationships between the selected data elements. The first computing device may send the rule set to the second computing device. The rule set may identify selected elements from the shared data set. In some embodiments, the computing device may generate the rule set based on one or more relationships between or among the selected elements of the shared data set.

As one example, a shared data set may include two or more image files, and each image file may include numerous pixels (picture elements). Each image file may be associated with additional data, such as a time stamp or other time information, location information and/or geolocation information where the image was obtained, weather information, and the like. Each pixel may be associated with a large number of information elements, such as a coordinate location in an image, color, intensity, luminosity, and the like. Each pixel may also be associated with the information of its respective image file. Thus, each pixel may be associated with a large number of information elements, which may be considered variables. In some embodiments, the rule set may include information identifying one or more pixels of the shared data set. In some embodiments, the rule set may include information identifying one pixel of the shared data set, and relationship information that enables the identification of one or more other pixels using the identified first pixel and the relationship information.

However, the shared data set is not limited to image files, and a shared data set may be generated or compiled using data that may include identifiable data elements, and/or in which relationships between or among two or more data elements may be determined. Examples of such data include video files, audio files, biometric samples, location data (e.g., Global Positioning Satellite system data), and the like.

In some embodiments, the first computing device may generate a result using information in the selected elements of the shared data set. In some embodiments, the generated result may include a string of data. In some embodiments, the generated result may include a value based on the information in the selected elements of the shared data set. In some embodiments, the first computing device may perform a transform of the information of the selected elements, such as generating a hash of values of the information. In some embodiments, the first computing device may generate a data string based on the information of the selected elements and may perform a transform (e.g., generate a hash) of the information of the selected elements to generate the first result.

In various embodiments, a second computing device having the shared data set may receive the rule set from the first computing device, and use the rule set and the shared data set to extract the data elements from the shared data set. For example, the second computing device may apply the rule set to its stored version of the RDCDB to identify the pixels (for example) and their associated location, order in the data set, numerical values for color, density, etc. The second computing device may create a data string from the application of the rule set. In some embodiments, the generated result may include a string of data. In some embodiments, the generated result may include a value based on the information in the selected elements of the shared data set. In some embodiments, the second computing device may perform a transform of the information of the selected elements, such as generating a hash of values of the information. In some embodiments, the second computing device may generate a data string based on the information of or within the selected elements and may perform a transform (e.g., generate a hash) of the data string to generate the second result. The second computing device may send the generated second result to the first computing device.

In some embodiments, the first computing device may receive the second result generated by the second computing device, and may compare the first result (generated by the first computing device) and the second result (generated by and received from the second computing device) to determine whether the results match. In response to determining that the results match, the first computing device may determine that the second computing device is authenticated. Having authenticated the first computing device, the second computing device may begin a data exchange session (e.g., an information transaction).

In some embodiments, the second computing device may use the same or a different shared data set to provide the first computing device with information that enables the first computing device to authenticate the second computing device. For example, the second computing device may send a rule set and a result to the first computing device that enables the first computing device to obtain a result from the shared data set and compare the obtained and received results to authenticate the second computing device in a similar manner.

In various embodiments, each computing device may independently authenticate each other computing device. Since the shared data set (e.g., the RDCDB) is constantly changing, an adversary that acquires any particular copy will most likely be unable to use the acquired data set before the computing devices alter the shared data set. Even an adversary with persistent presence in one of more of the computing devices would have to be present simultaneously within each participating computing device to defeat the authentication. In various embodiments, unless each computing device independently and mutually authenticates the other computing device(s), the one or more of the computing devices may determine that another computing device is not authenticated, and may prevent further communication with the un-authenticated computing device.

In various embodiments, three or more computing devices may establish a group communication session. In some embodiments, each computing device may independently authenticate each other computing device in the group communication session. In some embodiments, in order to join the group communication session, a computing device may be required to be authenticated by each other computing device in the group communication session. In some embodiments, in order to establish the group communication session, each computing device may be required to independently authenticate each other computing device in the group communication session.

Figure 1B:
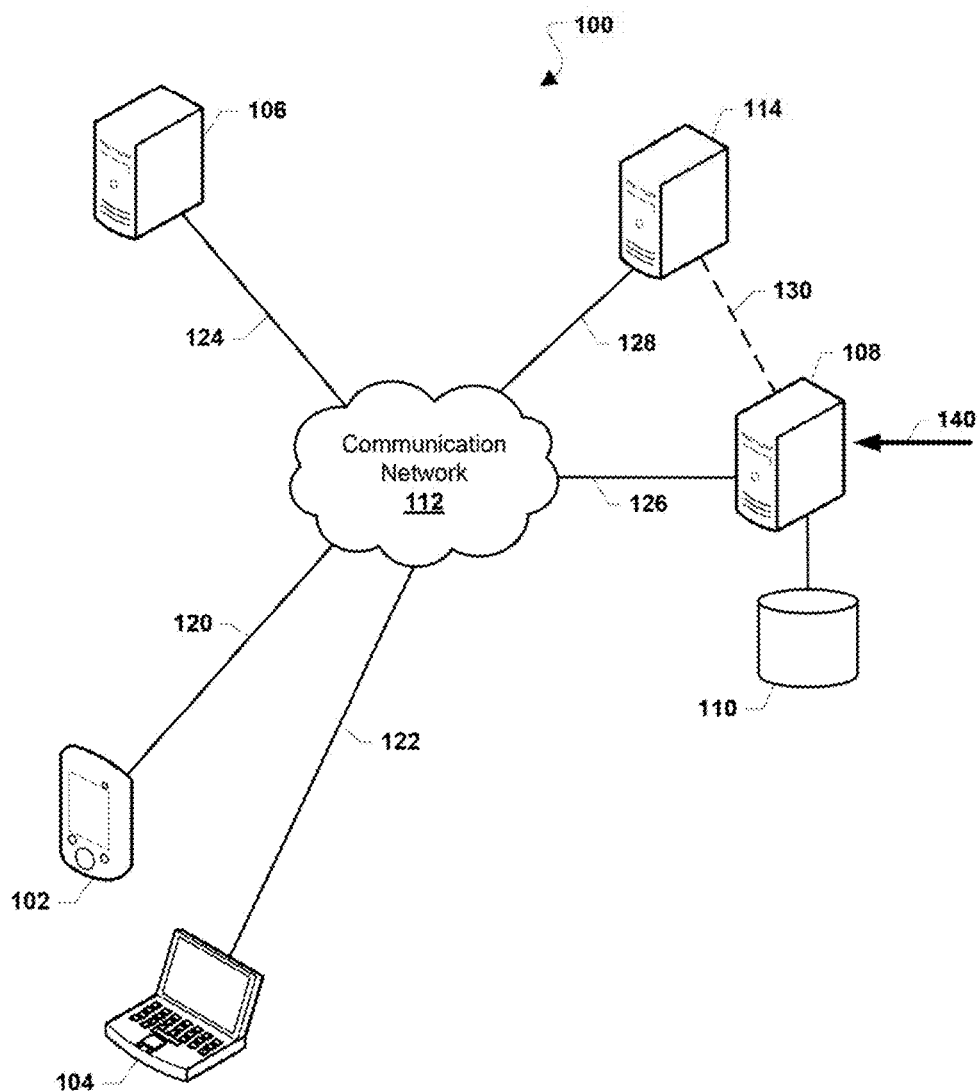

Various embodiments may be implemented within a variety of communication systems 150, an example of which is illustrated in FIG. 1A. The communication system 150 may include a variety of entities that may communicate using a communication network, such as an IoT network 154, a law firm 156, a defense contractor 158, a subcontractor 160, a bank 162, a health care entity 164, an online commerce entity 166, and a telecom entity 168. Each of the entities 154-168 may communicate with and among each other. Each of the entities 154-168 may also communicate with a certificate authority 152. The certificate authority 152 may include one or more computing devices configured to perform operations to enable the authentication of a computing device, as further described below. The entities 154-168 are merely exemplary, and the communication network 150 may include a wide variety of entities, including entities that may handle health care records, secure communications (e.g., for a business or government agency), public records, voting systems, financial services, security brokerage systems, IoT communications, commercial transactions, and a wide range of other contexts, Various embodiments may be implemented within a variety of communication systems 100, an example of which is illustrated in FIG. 1B. With reference to FIGS. 1A and 1B, the elements of communication system 100 may be used in any of the entities 154-168. The communication system 100 may include computing devices 102, 104, 106, and 108. In some embodiments, the computing devices 102 and 104 may include a computing device used directly by a user, such as a smart phone, a laptop computer, a desktop computer, and the like. It will be understood that a user may operate more than one such computing device similar to the computing devices 102 and 104. In some embodiments, the computing devices 102 and 104 may include one or more IoT devices. Non-limiting examples of IoT devices include personal or mobile multi-media players, gaming systems and controllers, smart televisions, set top boxes, smart kitchen appliances, smart lights and lighting systems, smart electricity meters, smart heating, ventilation, and air conditioning (HVAC) systems, smart thermostats, building security systems including door and window locks, vehicular entertainment systems, vehicular diagnostic and monitoring systems, machine-to-machine devices, and similar devices that include a programmable processor and memory and circuitry for establishing wireless communication pathways and transmitting/receiving data via wireless communication pathways. The computing devices 102 and 104 may also include an unmanned, autonomous, semi-autonomous, or robotic vehicle capable of travel of travel on land, sea, air, or in space. The computing devices 102 and 104 may further include a smart firearm or another processor-equipped weapon or weapon system.

In some embodiments, the computing devices 106 and 108 may include a back-end computing device such as a server. In some embodiments, the computing device 108 may communicate with an electronic security system 114 over a communication link 130. In some embodiments, the computing devices 106 and 108 (and possibly the computing device 114) may be operated by one entity. For example, a health care entity 164 or a telecom entity 168 may operate one or more of the computing devices 106, 108, and/or 114. In some embodiments, the computing devices 106, 108, and 114 may be operated by more than one entity.

Each of the computing devices 102, 104, 106, and 108, and the electronic security system 114 may communicate with a communication network 112 over a respective communication link 120, 122, 124, 126, 128, and 130. In some embodiments, the communication network 112 may include two or more communication networks. The communication links 120, 122, 124, 126, 128, and 130 may include wired or wireless communication links, and may further include additional devices to facilitate communication between the computing devices 102, 104, 106, and 108, the electronic security system 114, and the communication network 112. Examples of such additional devices may include access points, base stations, routers, gateways, wired and/or wireless communication devices, as well as backhaul communication links that may include fiber optic backhaul links, microwave backhaul links, and other suitable communication links.

In some embodiments, the computing devices 102, 104, 106, and 108, and the electronic security system 114 may be part of a secure network, such as an internal enterprise network, a government agency secure network, a virtual private network (VPN), or another similar network environment. In such a secure network, the communication links 120, 122, 124, 126, 128, and 130 may include additional security, such as encryption at one or more layers (i.e., Open Systems Interconnection (OSI) layers), and other implementations to secure communications along the communication links 120, 122, 124, 126, 128, and 130.

In some embodiments, the computing device 106 may be configured to perform operations related to information transactions in a variety of contexts, including, without limitation, health care record management, secure communications, public records management systems, voting systems, financial services systems, security brokerage systems, as an IoT device controller, to perform a commercial transaction, as well as other contexts. In some embodiments, the computing device 108 may be configured to perform operations related to generating and/or obtaining transitory identities, and authentication of a computing device such as one or more of the computing devices 102, 104, and 106, as further described below.

In some embodiments, the electronic security system 114 may be configured to perform network monitoring or network security functions, such as a network monitoring system, a key logging system, or another similar system. In some embodiments, electronic security system 114 may detect an unauthorized user or electronic intruder using or accessing the communication network 112, and may send an indication to the computing device 108 of the detection of the unauthorized user or electronic intruder. In some embodiments, the electronic security system 114 may be configured to monitor for and/or detect unauthorized accesses of a system, memory, network element, or component of a network element from an otherwise authorized user (e.g., an "insider" threat). In some embodiments, the electronic security system 114 may be configured to receive a command or an indication that a computing device should be de-authorized from access to the communication system. For example, the electronic security system 114 may be a component or an element of a network authorization system, or a human resources system, or a system that provides a list of authorized users of the communication system, or another similar system. In such embodiments, the electronic security system 114 may receive a command or another message indicating that an authorization of a computing device should be removed or blocked. In some embodiments, in response to receiving an indication that an unauthorized user or electronic intruder has been detected, that a computing device authorization should be removed or blocked, or another similar indication, the computing device 108 may send an instruction to one or more of the computing devices 102, 104, and 106 to obtain a new transitory identity, as further described below.

The communication network 112 may include a variety of communication networks, including communication networks within an entity or enterprise, and external communication networks, publicly available communication networks, and combinations of networks as well as internetworks, including the internet. The communication network 112 may support communications using one or more wired and wireless communication protocols. Each of the communication links 120, 122, 124, and 126 may be two-way wired or wireless communication links. Wireless communication protocols may include one or more radio access technologies (RATs). Examples of wireless RATs include 3GPP Long Term Evolution (LTE), Worldwide Interoperability for Microwave Access (WiMAX), Code Division Multiple Access (CDMA), Time Division Multiple Access (TDMA), Wideband CDMA (WCDMA), Global System for Mobility (GSM), and other RATs. Examples of RATs may also include Wi-Fi, Bluetooth, Zigbee, LTE in Unlicensed spectrum (LTE-U), License Assisted Access (LAA), and MuLTEfire (a system that uses LTE on an unlicensed carrier band). Wired communication protocols may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

While the communication links 120, 122, and 124 are illustrated as single links, each of the communication links may include a plurality of wired or wireless links, such as plurality of frequencies or frequency bands, each of which may include a plurality of logical channels. Additionally, each of the various communication links 120, 122, and 124 may utilize more than one communication protocol.

The computing device 108 may communicate with a data store 110, such as a memory device, database, server device, or another device capable of storing data. In some implementations, the data store 110 may store an audit trail and associated metadata.

The computing device 108 may receive data inputs 140 over time. The data inputs 140 may include information that the computing device 108 may use to generate a data set that can be shared with another computing device (e.g., the computing devices 102, 104, and 106). The data inputs 140 may include, for example, images, photographs, video, sound recordings (e.g., music, ambient sound recordings, or another such recording), biometric information inputs (e.g., facial recognition scans, iris scans, DNA samples, a voice-print recordings, fingerprints, and the like), or any other such data input.

Figure 1C:
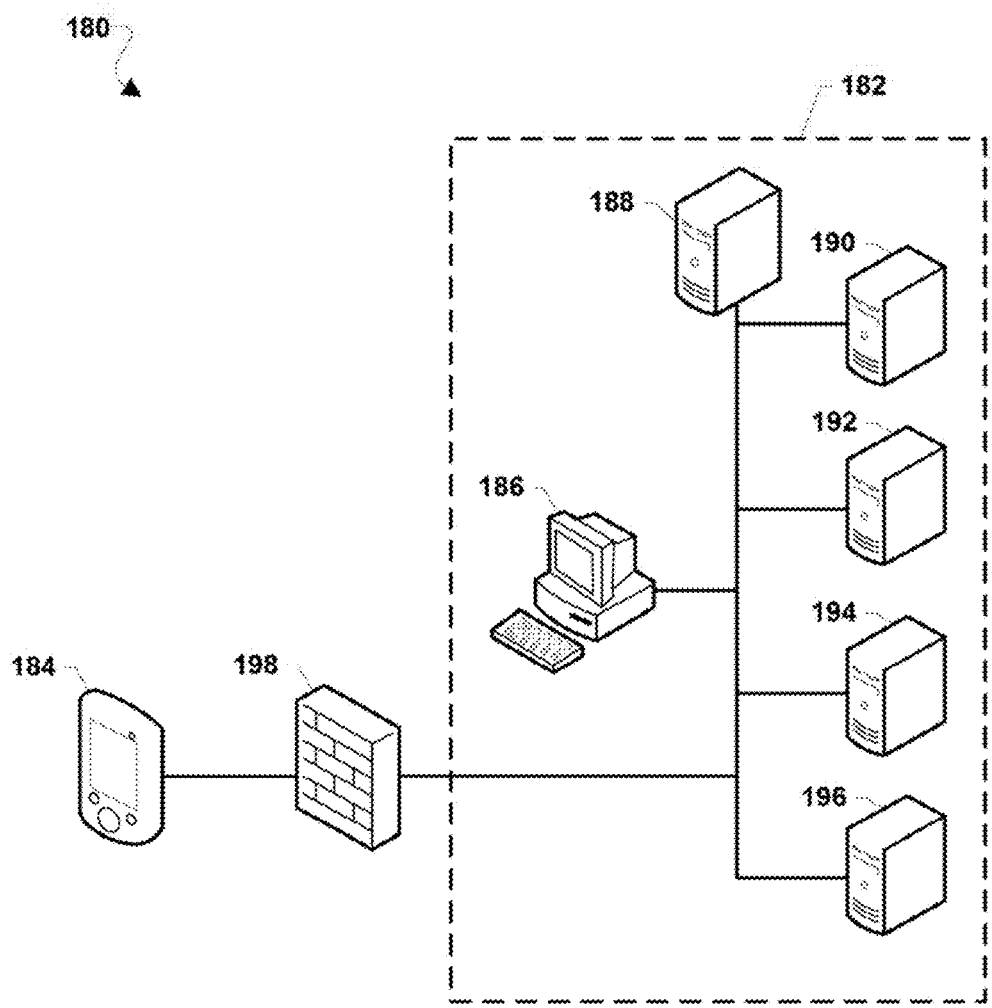

Various embodiments may be implemented within a variety of communication systems 180, an example of which is illustrated in FIG. 1C. With reference to FIGS. 1A-1C, the elements of communication system 150 may be used in any of the entities 154-168. The communication system 180 may include computing devices 184, 186, 188, 190, 192, 194, and 196. The computing devices 190-196 may include network elements, such as file servers, databases, or other similar network-accessible data sources. The computing devices 184 and 186 may include any form of user-operable network terminal, and may be similar to the computing devices 102 and 104. The computing devices 186-196 may be elements in a communication network 182, access to which may be protected by a device configured to protect electronic access to the communication network 182, such as a firewall 198.

Conventional communication security implementations, such as the firewall 198, may protect the network 182 against attacks or exploitation by an external device, such as the computing device 184. However, the firewall 198 may not protect the network 182 against attacks or explication from a device that is inside the firewall 198, such as the computing device 186.

Various embodiments may include the computing device 188 (which may be similar to the third computing device 108), which may be configured to perform operations related to generating and/or obtaining transitory identities, and authentication of an identity of a computing device such as one or more of the computing devices 184, 186, 190, 192, 194, and 196.

In various embodiments, while the firewall 198 may be employed to perform network operations such as traffic monitoring, gateway functions, routing, and other similar functions, the firewall 198 may not perform a security function or an authentication function of devices such as the computing devices 184 and 186. Rather, in the communication system 180, the computing devices 184 and 186 may communicate with the computing device 188 and/or with each other, enabling authentication of an identity of each of the computing devices 184 and 186, as well as, in some embodiments, an identity of the computing device 188. Similarly, while the communication system 180 may use inputs received at the computing device 184 or 186, such as a username and password, to identify a purported user or as a pointer to a user account, communication system 180 may not use credentials such as a username and password for security purposes or for authentication purposes. Rather, the communication system 180 may authenticate the identity of the computing devices 184 and 186 based on transitory and/or dynamic information of each computing device, as further described below.

Figure 2:
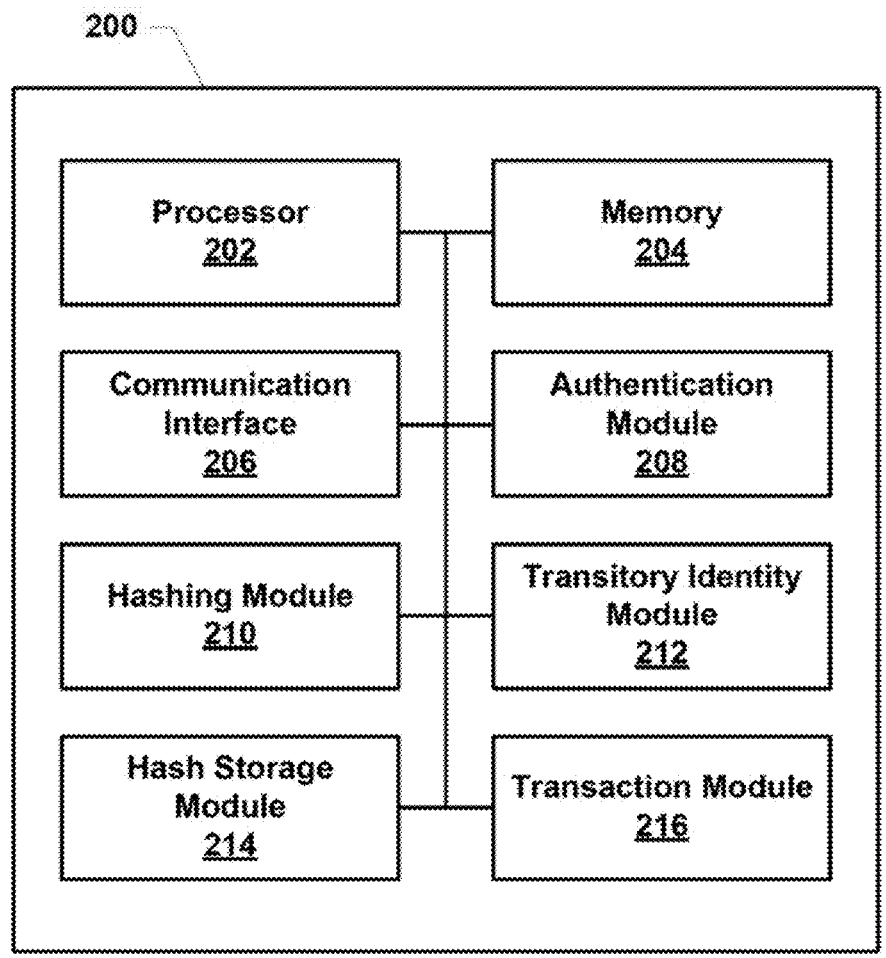
FIG. 2 is a component block diagram of a communication device suitable for use with various embodiments.

FIG. 2 is a component block diagram of a computing device 200 suitable for implementing various embodiments. With reference to FIGS. 1 and 2, in various embodiments, the computing device 200 may be similar to the computing devices 102, 104, 106, and 108.

The computing device 200 may include a processor. The processor 202 may be configurable with processor-executable instructions to execute operations of the various embodiments, a specialized processor, such as a modem processor, configurable with processor-executable instructions to execute operations of the various embodiments in addition to a primary function, a dedicated hardware (i.e., "firmware") circuit configured to perform operations of the various embodiments, or a combination of dedicated hardware/firmware and a programmable processor.

The processor 202 may be coupled to memory 204, which may be a non-transitory computer-readable storage medium that stores processor-executable instructions. The memory 204 may store an operating system, as well as user application software and executable instructions. The memory 204 may also store application data, such as an array data structure. The memory 204 may include one or more caches, read only memory (ROM), random access memory (RAM), electrically erasable programmable ROM (EEPROM), static RAM (SRAM), dynamic RAM (DRAM), or other types of memory. The processor 202 may read and write information to and from the memory 204. The memory 204 may also store instructions associated with one or more protocol stacks. A protocol stack generally includes computer executable instructions to enable communication using a radio access protocol or communication protocol.

The processor 202 may also communicate with a variety of modules for units configured to perform a variety of operations, as further described below. For example, the processor 202 may communicate with a communication interface 206, an authentication module 208, a hashing module 210, a transitory identity module 212, the hash storage module 214, and a transaction module 216. The modules/units 206-216 may be implemented on the computing device 200 in software, and hardware, or in a combination of hardware and software. Firmware, chip, system-on-a-chip (SOC), dedicated hardware (i.e., "firmware") circuit configured to perform operations of the various embodiments, or a combination of dedicated hardware/firmware and a programmable processor. The processor 202, the memory 204, and the various modules/units 206-216 may communicate over a communication bus or any other communication circuitry or interface.

The communication interface 206 may include a network interface that may enable communications with a communication network (e.g., the communication network 112). The communication interface 206 may include one or more input/output (I/O) ports through which a connection, such an Ethernet connection, a fiber optic connection, a broadband cable connection, a telephone line connection, or other types of wired communication connection may be provided. The communication interface 206 may also include a radio unit that may enable radio frequency communication.

The authentication module 208 may provide or be in communication with one or more input devices to receive an input from a user for login to the computing device 200. The input devices may include one or more buttons, sliders, touchpads, keyboards, biometric input devices, cameras, fingerprint readers, and other similar input devices.

The transitory identity module 212 may generate a transitory identity for the computing device 200. The transitory identity may be based on one or more dynamic aspects of the computing device 200, individually or in combination with other dynamic or static information. The dynamic aspects of the computing device 200 may include aspects of the first computing device that change relatively rapidly, such as a clock time, a chip state, a register state, or any other source of data based on a dynamic aspect of the first computing device.

The hashing module 210 may generate hash of a transitory identity that is generated by the transitory identity module 212. The hash storage module 214 may include a memory device, or may communicate with the memory 204, to store a transitory identity generated by the transitory identity module 212 and/or a hash of a transitory identity generated by the hashing module 210.

The transaction module 216 may enable communication related to a transaction (as well as other communications) with another computing device (for example, between the computing device 102 and the computing device 106). In some implementations, the transaction module 216 may include hardware and/or software configured to provide a streamlined communication and/or transaction process with the transaction server. In some implementations, the transaction module may include hardware and/or software configured to provide a streamlined communication related to a specific service provider, such as a so-called "1-click" service or another streamlined communication/transaction process.

Figure 3A:
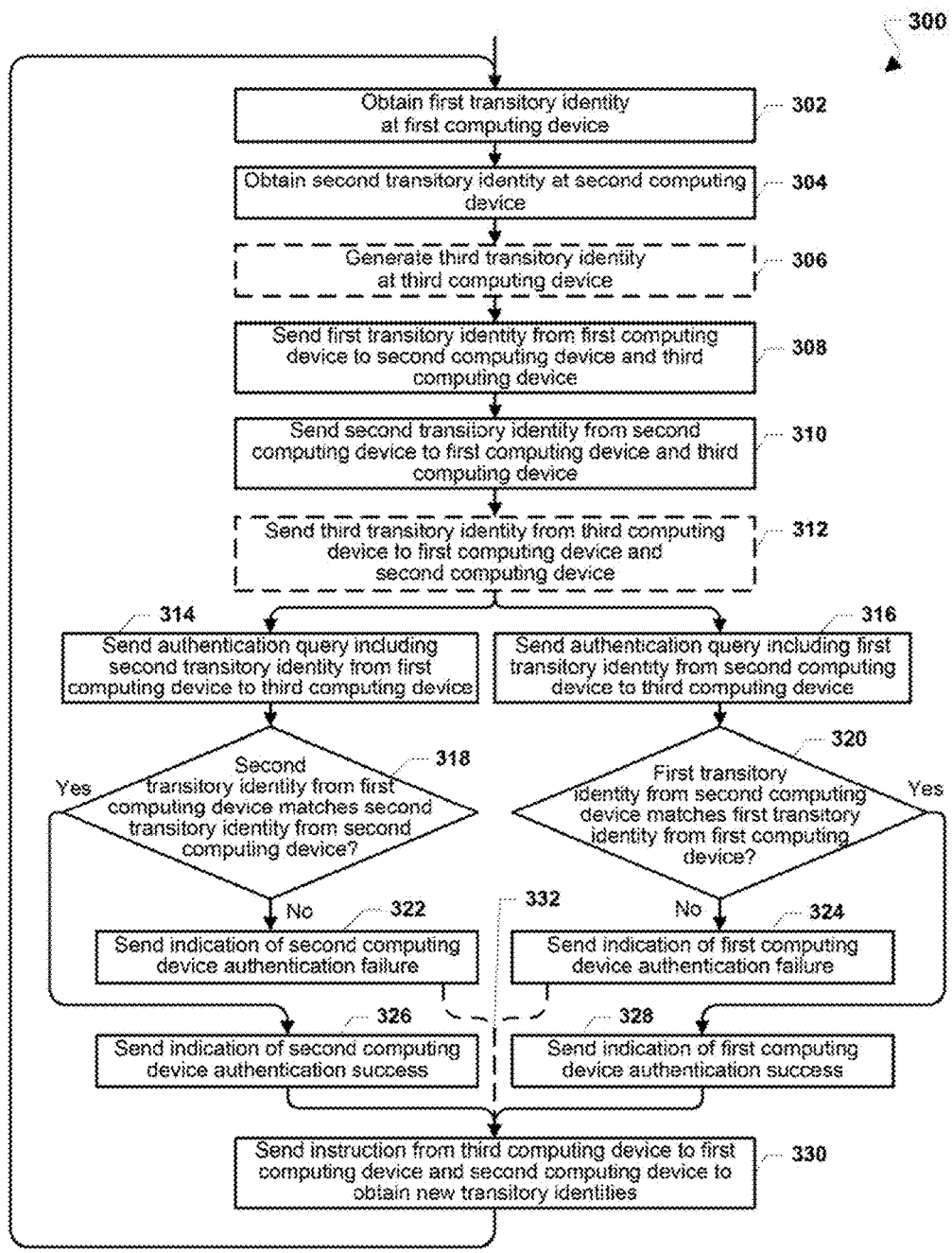
FIG. 3A is a process flow diagram illustrating a method of authenticating one computing device to another computing device according to various embodiments.
Figure 3B:
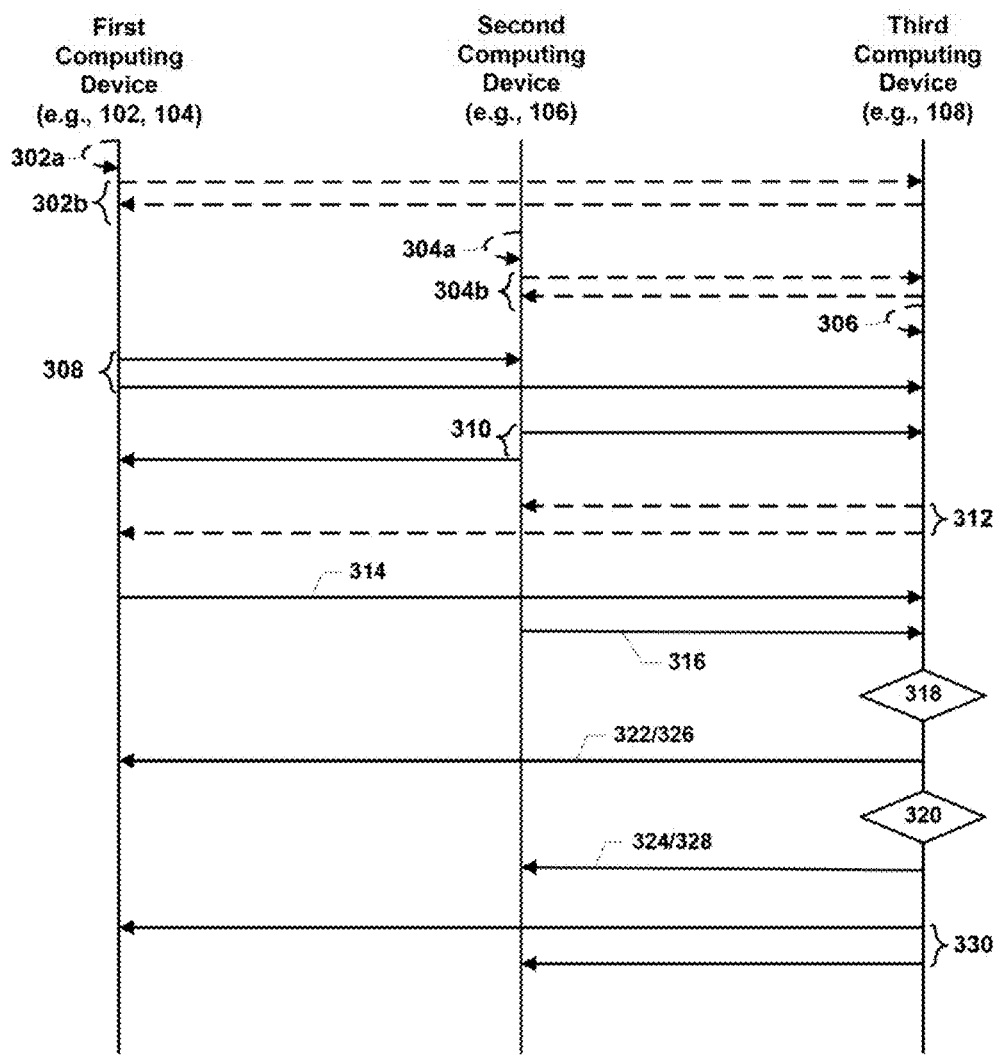
FIG. 3B is a message flow diagram illustrating another method of authenticating one computing device to another computing device according to various embodiments.
Figure 3C:
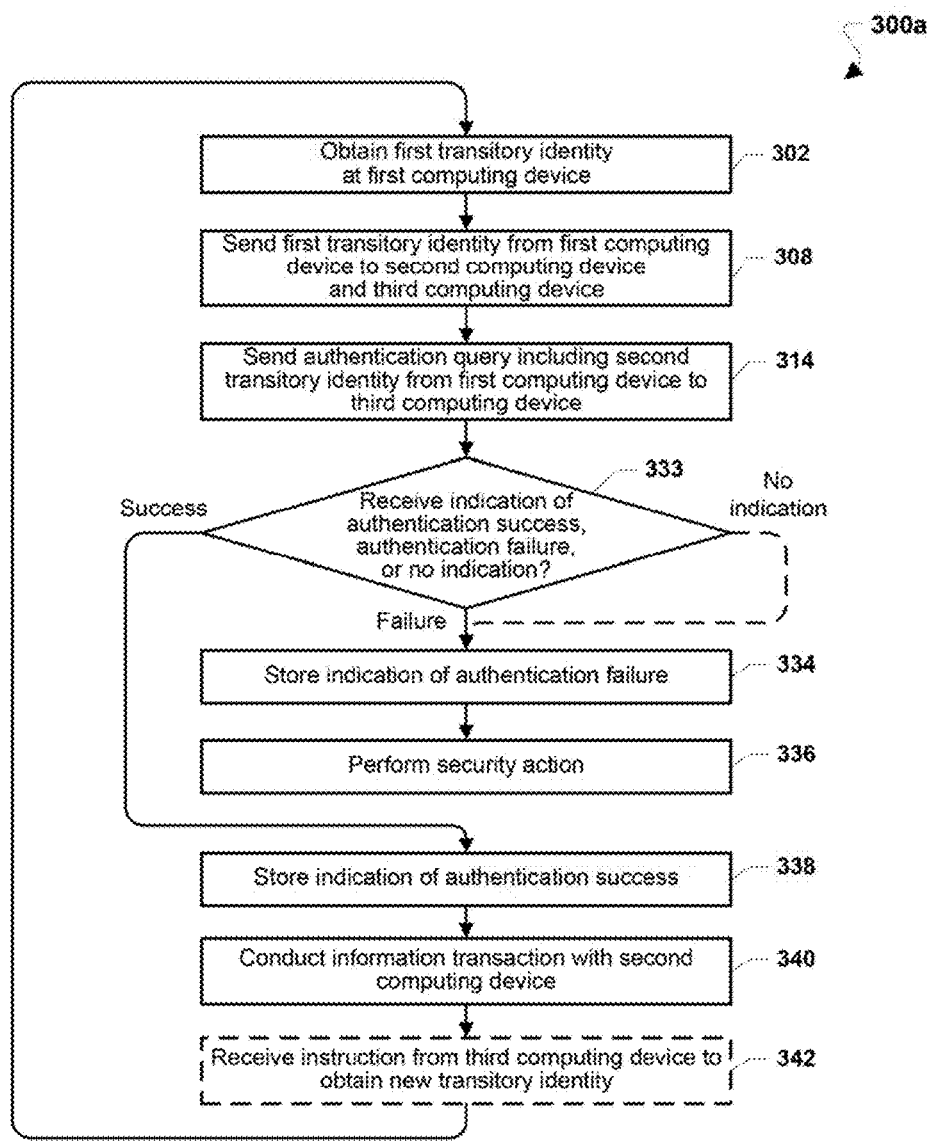
FIG. 3C illustrates a method 300a of operations executed by the first computing device as part of the method 300 according to various embodiments.
Figure 3D:
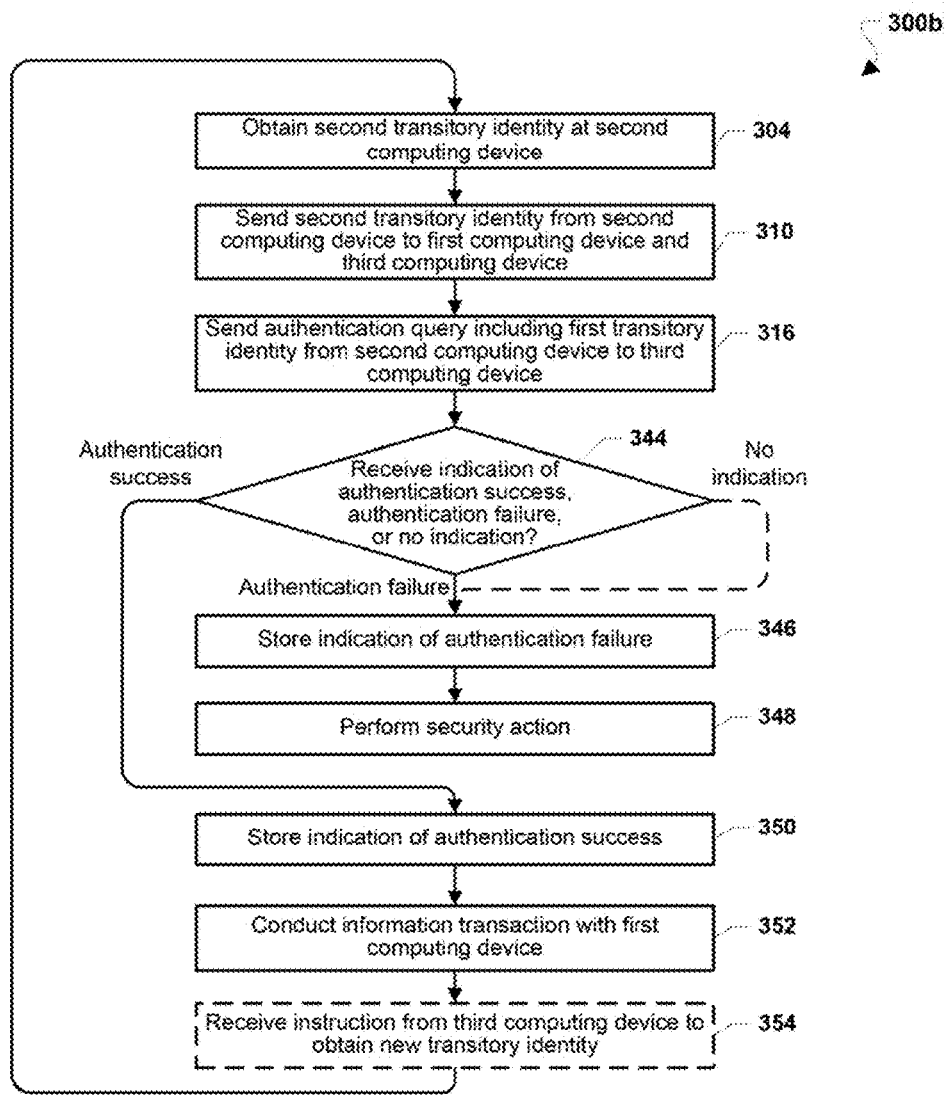
FIG. 3D illustrates a method 300b of operations executed by the second computing device as part of the method 300 according to various embodiments.
Figure 3E:
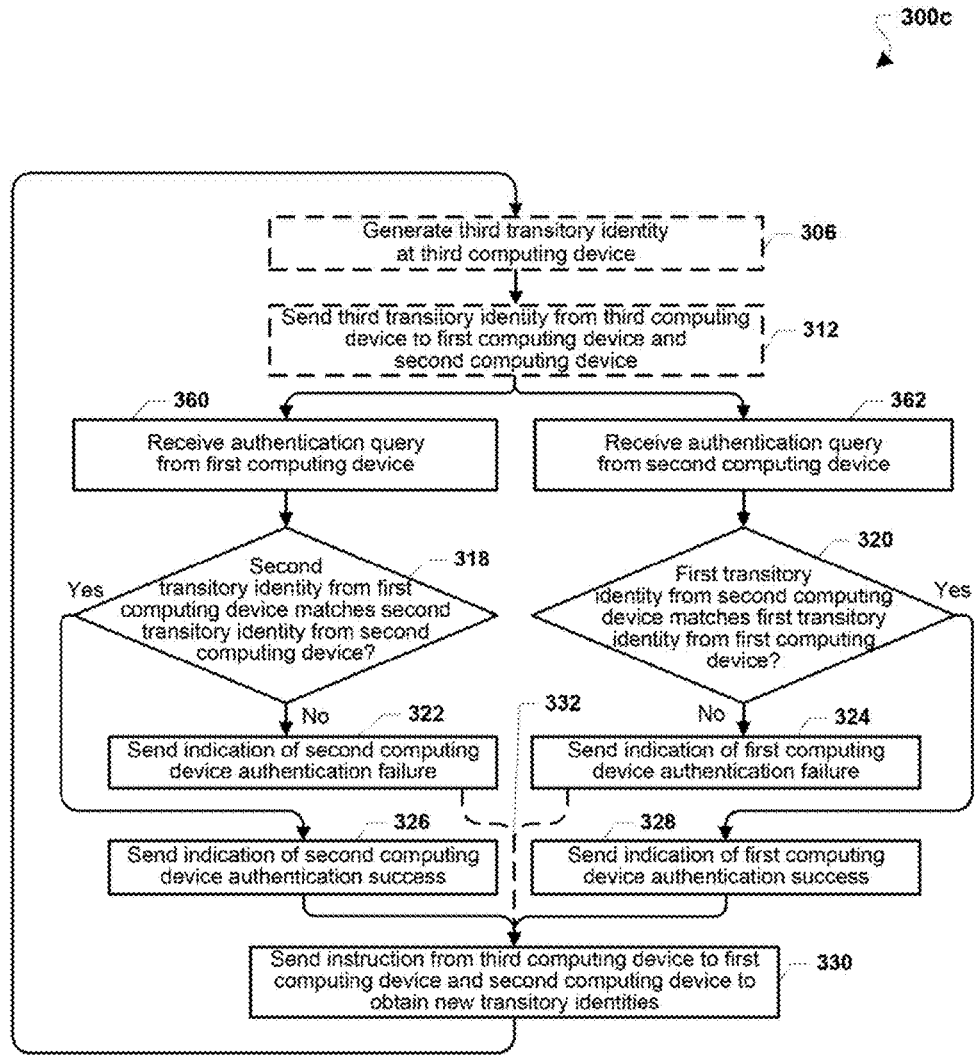
FIG. 3E illustrates a method 300c of operations executed by the third computing device as part of the method 300 according to various embodiments.

FIGS. 3A and 3B illustrate a system method 300 of authenticating a first computing device (e.g., the computing device 102, 104, 184, 186, and 200 of FIGS. 1B-2) to a second computing device (e.g., the computing device 106, 190-196, and 200 of FIGS. 1B-2), and vice versa, through interactions with a third computing device (e.g., 108, 188, and 200 of FIGS. 1B-2) according to some embodiments. FIG. 3C illustrates a method 300*a* of operations executed by the first computing device as part of the method 300. FIG. 3D illustrates a method 300*b* of operations executed by the second computing device as part of the method 300. FIG. 3E illustrates a method 300*c* of operations executed by the third computing device as part of the method 300. With reference to FIGS. 1A-3E, the method 300 may be implemented by a processor (e.g., the processor 202 and/or the like) of a first computing device (i.e., a device processor), a processor of a second computing device, and a processor of a third computing device.

In various embodiments, prior to or as part of the method 300, a first computing device (e.g., the computing device 102 or 104) and a second computing device (e.g., the computing device 106) may establish accounts with a third computing device (e.g., the computing device 108), which may, in some embodiments, function as an authentication server. In various embodiments, the first computing device and the second computing device may be configured with (e.g., initialize, configure, install, etc.) one or more modules enabling each computing device to perform the operations of the method 300 (e.g., the modules 206-216).

In some embodiments, establishing an account with the third computing device may include determining and/or negotiating a communication path between the third computing device and the first/second computing device. In some embodiments, each of the first and second computing devices may negotiate or determine a communication path with the third computing device that differs in one or more aspects. For example, each computing device pair may use a different encryption method or protocol, communication protocol or application (e.g., hypertext markup language (HTML), short message service (SMS) text message), and the like. In various embodiments, a user may establish a plurality of accounts with a plurality of authentication servers without limitation.

Various embodiments may provide a defense against the penetration and compromise of communications between any two of the first computing device, the second computing device, and the third computing device. For example, an attacker performing a man-in-the-middle (MITM) attack may secretly relay communications between two network devices, and may monitor and/or alter those communications. Various embodiments would require an attacker to simultaneously compromise three communication pathways nearly simultaneously: a first communication pathway between the first computing device and the second computing device, a second communication pathway between the second computing device and the third computing device, and a third communication pathway between the third computing device and the first computing device.

Because the transitory identities are dynamic and frequently changed, an attacker would have to steal or intercept, and decrypt extremely rapidly, transitory identities sent using the three communication pathways. This potential vulnerability is defeated by the short validity duration of the different authentication informations exchanged between the three computing devices over the three separate communication pathways.

In block 302 of the method 300 and 300a, a processor of a first computing device (e.g., the computing device 102 or 104) may obtain a first transitory identity. In some embodiments, the processor of the first computing device may obtain the first transitory identify by generating the first transitory identity (e.g., operation 302a). In some embodiments, the processor of the first computing device may obtain a generated first transitory identity from a third computing device (e.g., the computing device 108) (e.g., operation 302b). In some embodiments, the processor of the third computing device may push the generated first transitory identity to the first computing device (e.g., the third computing device may send the generated transitory identity to the first computing device without a request from the first computing device). In some embodiments, the processor of the first computing device may pull the first transitory identity from the third computing device. For example, the first computing device may send a request for the transitory identity to the third computing device, and the third computing device may send the transitory identity to the first computing device in response to the request.

In block 304 of the method 300 and 300b, a processor of the second computing device (e.g., the computing device 106) may generate a second transitory identity (e.g., operation 304a). In some embodiments, the processor of the second computing device may obtain the first transitory identify by generating the second transitory identity. In some embodiments, the processor of the second computing device may obtain a second transitory identity from the third computing device (e.g., operation 304b). In some embodiments, the processor of the third computing device may push the second transitory identity to the second computing device. In some embodiments, the processor of the second computing device may pull the generated second transitory identity from the third computing device.

In optional block 306 of the method 300 and 300c, a processor of the third computing device (e.g., the computing device 108) may generate a third transitory identity.

In block 308 of the method 300 and 300a, the processor of the first computing device may send the first transitory identity to the second computing device and the third computing device. The transmission of the first transitory identity to the second computing device may be via any open communication link, such as a communication link that is in the process of being established between the first computing device and the second computing device. In some embodiments, the communication may be encrypted, and thus the transmission may be accomplished after an initial encryption key has been exchanged. In some embodiments, the communication link may be open (i.e., not encrypted) so that the computing devices can authenticate one another via various embodiments before exchanging encryption keys. The transmission of the first transitory identity to the third computing device may be via another communication link, which may be encrypted or not encrypted. In some embodiments, this transmission may be via a public network, such as the Internet. In some embodiments, this transmission may be via private or dedicated communication link.

In block 310 of the method 300 and 300b, the processor of the second computing device may send the second transitory identity to the first computing device and the third computing device. The transmission of the second transitory identity to the first computing device may be via any open communication link, such as the communication link that is in the process of being established between the first computing device and the second computing device by which the second computing device receives the first transitory identity. In some embodiments, the communication may be encrypted, and thus the transmission may be accomplished after an initial encryption key has been exchanged. In some embodiments, the communication link may be open (i.e., not encrypted) so that the computing devices can authenticate one another via various embodiments before exchanging encryption keys. The transmission of the second transitory identity to the third computing device may be via another communication link, which may be encrypted or not encrypted. In some embodiments, this transmission may be via a public network, such as the Internet. In some embodiments, this transmission may be via private or dedicated communication link.

In optional block 312 of the method 300 and 300c, the processor of the third computing device may send the third transitory identity to the first computing device and the second computing device. The transmission of the third transitory identity to the first and second computing devices may be via the same communication links by which the third computing device received the first and second transitory identities. Such communication links may be encrypted or not encrypted. In some embodiments, this transmission may be via a public network, such as the Internet. In some embodiments, this transmission may be via private or dedicated communication link.

In block 314 of the method 300 and 300a, the processor of the first computing device may send an authentication query including the second transitory identity to the third computing device. In some embodiments, the first computing device may send the authentication query automatically, such as in the background. In some embodiments, the first computing device may send the authentication query in response to a command In some embodiments, the authentication request may include a small unit of information that may be stored at the first computing device, such as text, an image, biometric information, or other readily personalizable information. In some embodiments, the first computing device may include the small unit of information in or with the authentication request.

In block 316 of the method 300 and 300b, the processor of the second computing device may send an authentication query including the first transitory identity to the third computing device.

In determination block 318 of the method 300 and 300c, the processor of the third computing device may determine whether the second transitory identity from the first computing device matches the second transitory identity from the second computing device. In some embodiments, the third computing device may perform this operation by a direct comparison of the two received transitory identities (e.g., a subtraction and check for remainder). In some embodiments, the third computing device may perform this operation by performing a hash function on one or both of the received transitory identities and determining whether the two match by comparing the results of the hash function(s).

In response to determining that the second transitory identity from the first computing device does not match the second transitory identity from the second computing device (i.e., determination block 318="No"), the processor of the third computing device may send an indication of authentication failure of the second computing device to the first computing device and/or the second computing device in block 322.

In response to determining that the second transitory identity from the first computing device matches the second transitory identity from the second computing device (i.e., determination block 318="Yes"), the processor of the third computing device may send an indication of authentication success of the second computing device to the first computing device and/or the second computing device in block 326.

In determination block 320 of the method 300 and 300c, the processor of the third computing device may determine whether the first transitory identity from the second computing device matches the first transitory identity from the first computing device.

In response to determining that the first transitory identity from the second computing device does not match the first transitory identity from the first computing device (i.e., determination block 320="No"), the processor of the third computing device may send an indication of authentication failure of the first computing device to the first computing device and/or the second computing device in block 324.

In response to determining that the first transitory identity from the second computing device matches the first transitory identity from the first computing device (i.e., determination block 320="Yes"), the processor of the third computing device may send an indication of authentication success of the second computing device to the first computing device and/or the second computing device in block 328.

In some implementations, the indications of authentication failure or authentication success may include a very short message or data structure, and some implementations, the indication may include a single bit, such as a 0 or a 1, indicating authentication failure or authentication success, respectively.

Following the operations of blocks 326 and/or 328 of the methods 300 and 300c, the processor of the third computing device may send an instruction to the first computing device and the second computing device to obtain new transitory identities in block 330. In some embodiments, the instruction may include an instruction to generate a new transitory identity at the first and second computing devices, respectively. In some embodiments, the instruction may include an instruction to each of the first and second computing devices respectively to obtain a new transitory identity from the third computing device. In some embodiments, the third computing device may generate and send a new transitory identity for each of the first and second computing devices without a request from either the first or second computing device.

The processors of the first, second, and third computing devices may then perform the operations of blocks 302, 304, and 306 of the methods 300, 300a, 300b and 300c, respectively. The first, second, and third computing devices may at intervals repeat the operations of the methods 300, 300a, 300b and 300c to perform background authentication of the other computing devices from time to time. In some embodiments, the processors of the first, second, and third computing devices may repeat the operations of the methods 300, 300a, 300b and 300c from time to time with or without an instruction or other message from another of the first, second, and third computing devices. By using a dynamic system of device authentication, the methods 300, 300a, 300b and 300c substantially reduces the possibility that any of the transitory identities may be intercepted and used to impersonate one of the computing devices.

In some embodiments, the third computing device may perform the operations of block 330 and 300c in the event of an authentication failure of the first computing device and/or the second computing device 332. For example, the third computing device may respond to an authentication failure of a computing device as an indication of a compromise or an attempted compromise of a participating computing device, or of the system. In various embodiments, as a response to a possible breach or an actual breach of a system's communications, the third computing device may instruct all participating computing devices to obtain new transitory identities. Because only computing devices that are configured to participate in the system may be able to obtain a new transitory identity, computing devices that are not so configured—such as cyber intruders and other adversaries—may be unable to obtain a new transitory identity, and will be effectively blocked from further communication using the system.

In some embodiments, the processors of the first, second, and third computing devices may repeat their respective operations at a frequency that is less than a determined time required for an attacker to obtain and use the first and/or second transitory identities. For example, in some embodiments, the duration of the first, second, and/or third transitory identities (the "validity durations") may be set to be shorter than the time required by an attacker to obtain and exploit one or more of the transitory identities. In some embodiments, the processor of the first and/or second third computing devices may obtain a new transitory identity in response to determining that the validity duration of the respective first and/or second transitory identity has expired. In some embodiments, the processor of the third computing device may generate a new transitory identity for the first, second, and/or third computing devices in response to determining that the validity duration of the respective first and/or second transitory identity has expired.

FIG. 3C illustrates a method 300a of operations executed by the first computing device as part of the method 300. With reference to FIGS. 1A-3E, the method 300a may be implemented by a processor (e.g., the processor 202 and/or the like). In blocks 302, 308, and 314, the processor of the first computing device may perform operations of like-numbered blocks of the method 300.

In determination block 333, the processor of the first computing device may determine whether an indication of authentication success or an indication of authentication failure is or has been received from the third computing device. In some optional embodiments, the processor may also determine whether no indication is received from the third computing device.

In response to determining that an indication of authentication failure is or has been received (i.e., determination block 333="Failure"), or optionally that no indication has been received (determination block 333="No indication"), the processor of the first computing device may store an indication of the authentication failure in block 334.

In block 336, the processor of first computing device may perform a security action. For example, the processor of the first computing device may stop performing the information transaction with the second computing device. The processor of the first computing device may also block further communication with the second computing device.

In response to determining that an indication of authentication success is or has been received (i.e., determination block 333="Success"), the processor of the first computing device may store an indication of the authentication success in block 338.

In block 340, the processor of the first computing device may conduct the information transaction with the second computing device. The processor of the first computing device may then obtain a new transitory identity in block 302. For example, the processor of the first computing device may determine that a validity duration of the transitory identity has expired, and in response to determining that the validity duration of the transitory identity has expired the processor of the first computing device may obtain a new transitory identity in block 302.

In optional block 342, the processor of the first computing device may receive an instruction from the third computing device to obtain a new transitory identity. The processor of the first computing device may then perform the operations of block 302.

FIG. 3D illustrates a method 300b of operations executed by the second computing device as part of the method 300. With reference to FIGS. 1A-3E, the method 300b may be implemented by a processor (e.g., the processor 202 and/or the like). In blocks 304, 310, and 316, the processor of the second computing device may perform operations of like-numbered blocks of the method 300.

In determination block 344, the processor of the second computing device may determine whether an indication of authentication success or an indication of authentication failure is or has been received from the third computing device. In some optional embodiments, the processor may also determine whether no indication is received from the third computing device.

In response to determining that an indication of authentication failure is or has been received (i.e., determination block 344="Authentication failure"), or optionally that no indication has been received (determination block 344="No indication"), the processor of the second computing device may store an indication of the authentication failure in block 346.

In block 348, the processor of second computing device may perform a security action. For example, the processor of the second computing device may stop performing the information transaction with the first computing device. The processor of the second computing device may also block further communication with the first computing device.

In response to determining that the processor receives an indication of authentication success (i.e., determination block 344="Authentication success"), the processor of the second computing device may store an indication of the authentication success in block 350.

In block 352, the processor of the second computing device may conduct the information transaction with the first computing device.

The processor of the second computing device may then obtain a new transitory identity in block 304. For example, the processor of the second computing device may determine that a validity duration of the second transitory identity has expired, and in response to determining that the validity duration of the second transitory identity has expired the processor of the second computing device may obtain a new transitory identity in block 304.

In optional block 354, the processor of the second computing device may receive an instruction from the third computing device to obtain a new transitory identity. The processor of the second computing device may then perform the operations of block 304.

FIG. 3E illustrates a method 300c of operations executed by the third computing device as part of the method 300. With reference to FIGS. 1A-3E, the method 300c may be implemented by a processor (e.g., the processor 202 and/or the like). In blocks 306-330 the device processor of the third computing device may perform operations of like-numbered blocks of the method 300.

In block 360, the processor of the third computing device may receive an authentication query from the first computing device. In determination block 318, the processor of the third computing device may determine whether the second transitory identity from the first computing device matches the second transitory identity from the second computing device, as described above.

In block 362, the processor of the third computing device may receive an authentication query from the second computing device. In determination block 320, the processor of the third computing device may determine whether the first transitory identity from the second computing device matches the first transitory identity from the first computing device, as described above.

Figure 4:
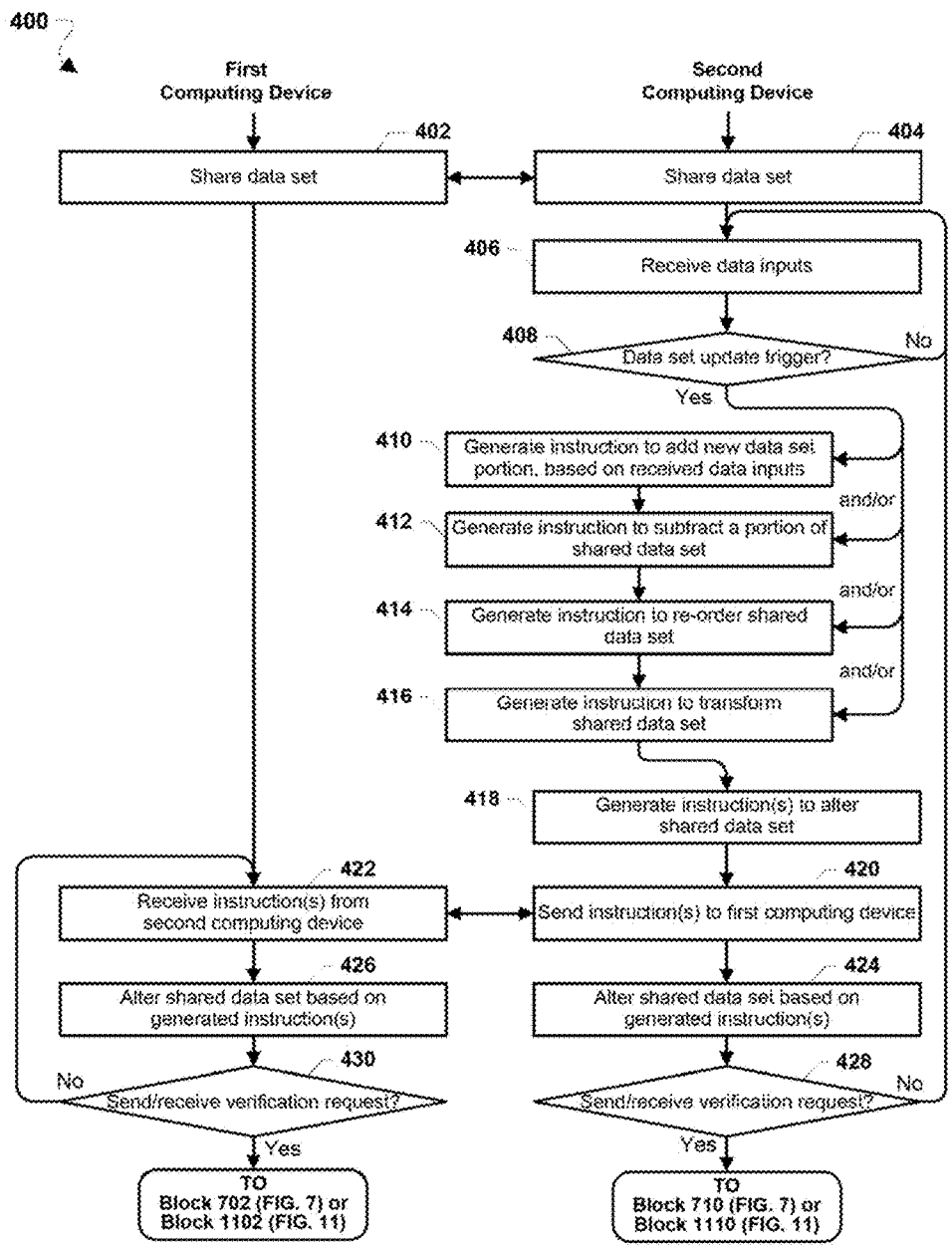
FIG. 4 illustrates a method 400 of dynamically altering a shared data set according to various embodiments.

FIG. 4 illustrates a method 400 of dynamically altering a shared data set according to some embodiments. With reference to FIGS. 1A-4, the method 400 may be implemented by a processor (e.g., the processor 202 and/or the like) of a computing device (e.g., the computing devices 102-108, 184-188, and 200).

Various embodiments enhance and improve the verification of computing devices on a communication network by utilizing a dynamically changing shared information context. The information context may include, for example, a dynamically changing shared data set. In some embodiments, two computing devices may share a data set by, for example, transmitting a data set from one computing device to another computing device. In various embodiments, the two computing devices may include any two endpoint devices in a computing network, such as a user device, a network server, an authentication server, or another computing device. The shared data set may be compiled over time, and may be changed by a computing device occasionally, periodically, and/or upon the occurrence of a triggering event. Changing or altering the shared data set may include reordering the shared data set, adding information to the shared data set, subtracting information from the shared data set, and/or transforming one or more portions of the shared data set.

The operations of the method 400 (as well as the methods 700, 800, 900, 1000, 1100, 1200, and 1300) are described below with respect to a first computing device and a second computing device. Any of the computing devices 102, 104, 106, 108, 184, and 186, and other computing devices, may function as a first computing device or a second computing device as such devices are described with respect to the method 400 (as well as the methods 700, 800, 900, 1000, 1100, 1200, and 1300).

In blocks 402 and 404, the first computing device and the second computing device may share a data set. For example, the second computing device may send the data set to the first computing device. In some embodiments, the first and second computing devices may share the data set occasionally, periodically, aperiodically, as part of an initialization procedure, or at some other time.

In block 406, the processor may receive data inputs. For example, the processor of the computing device may receive data inputs (e.g., the data inputs 140) over time. The data inputs may include information that the processor of the computing device may use to generate a data set that may be shared with another computing device. The data inputs may include, for example, images, photographs, video, sound recordings (e.g., music, ambient sound recordings, or another such recording), biometric information inputs (e.g., facial recognition scans, iris scans, DNA samples, a voice-print recordings, fingerprints, and the like), or any other data input.

In determination block 408, the processor may determine whether a shared data set update trigger has occurred. For example, the processor may determine whether a period of time has elapsed. As another example, the processor may determine whether a trigger event has occurred. The trigger event may include, for example, using a shared data set in an authentication process, such as extracting element(s) from shared data set, determining a value from the element(s), etc., as further described below. The trigger event may include, for example, a request from one or more computing devices to update the shared data set. The trigger event may include, for example, an authorization failure, or an authorization success, of a computing device.

In response to determining that the data set update trigger has not occurred (i.e., determination block 408="No"), the processor may continue to receive data inputs in block 406.

In response to determining that the data set update trigger has occurred (i.e., determination block 408="Yes"), the processor may perform one or more operations to dynamically alter the shared data set.

For example, in block 410, the processor may generate an instruction to add a new data set portion based on the received data inputs. In some embodiments, the processor may generate the new data set portion to be added. In some embodiments, the generated instructions may include instructions enabling the generation of the new data set portion (which may, e.g. be sent to the second computing device, as described below).

Additionally or alternatively, the processor may generate an instruction to subtract a portion of the shared data set in block 412.

Additionally or alternatively, the processor may generate an instruction to re-order the shared data set in block 414. For example, reordering the shared data set may include placing one or more portions of the shared data set into a different time, location, position, or other difference relative to other portions of the shared data set.

Additionally or alternatively, the processor may generate an instruction to transform the shared data set in block 416.

For example, the processor may generate an instruction to transform one or more elements and/or one or more portions of the shared data set.

Transforming an element and/or a portion may include performing one or more operations to alter one or more values of the element and/or portion. For example, transforming an element and/or a portion of an image or a video file may include rotating, flipping, inverting, shifting a position, shifting a color, applying a filter or preset transformation (e.g., as may be available in a photo or video editing software program), or another similar operation. As another example, transforming an element and/or a portion of a music or audio file may include raising or lowering pitches, reversing the content of the file, inverting the content of the audio file (i.e., transforming the content along a selected axis), adding an audio effect such as reverb, distortion, flanging, and the like, or another similar operation. As another example, transforming an element and/or a portion of the shared data set may include transcoding data elements (e.g., transforming audio data into visual data or text). As another example, transforming an element and/or a portion of the shared data set may include performing one or more mathematical functions to transform the element and/or portion.

In block 418, the processor may generate one or more instructions to alter the shared data set. The one or more instructions may be based on the generated new data set portion, the instruction to subtract a portion of the shared data set, and/or the instruction to re-order the shared data set.

In block 420, the processor of the second computing device may send the one or more instructions to the first computing device. In some embodiments, the generated instructions may include a newly generated data set portion (e.g., as may be generated in block 410).

In block 422, the processor of the first computing device may receive the one or more instructions from the second computing device.

In block 424, the processor of the second computing device may alter the shared data set based on the generated instruction or instructions.

In block 426, the processor of the first computing device may alter the shared data set based on the generated instruction or instructions.

In determination block 428, the processor of the second computing device may determine whether a verification request has been sent or received by the processor of the second computing device.

In response to determining that a verification request has not been sent or received (i.e., determination block 428="No"), the processor of the second computing device may continue to receive data inputs in block 406.

Figure 7:
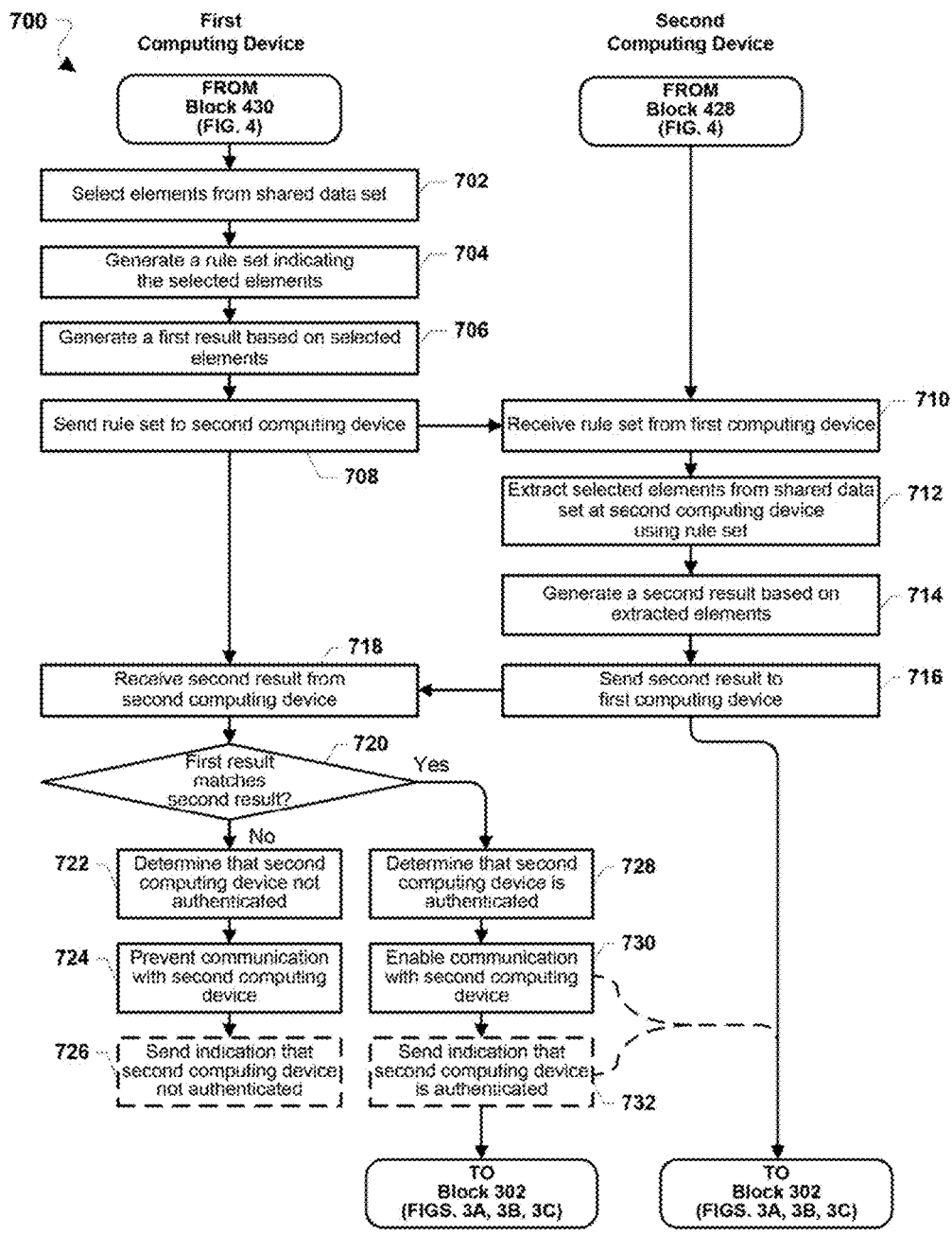
FIG. 7 illustrates a method 700 of authenticating a second computing device by a first computing device according to various embodiments.

In some embodiments, in response to determining that the verification request has been sent or received (i.e., determination block 428="Yes"), the processor of the second computing device may proceed to block 710 in FIG. 7. In some embodiments, in response to determining that the verification request has sent or received (i.e., determination block 428="Yes"), the processor of the second computing device may proceed to block 1110 in FIG. 11.

In determination block 430, the processor of the first computing device may determine whether a verification request has been sent or received by the processor of the first computing device.

In response to determining that a verification request has not been sent or received (i.e., determination block 430="No"), the processor of the first computing device may again receive one or more instructions from the second computing device in block 422.

In some embodiments, in response to determining that a verification request has been sent or received (i.e., determination block 426="Yes"), the processor of the first computing device may proceed to block 702 in FIG. 7. In some embodiments, in response to determining that a verification request has been sent or received (i.e., determination block 426="Yes"), the processor of the first computing device may proceed to block 1102 in FIG. 11.

Figure 5:
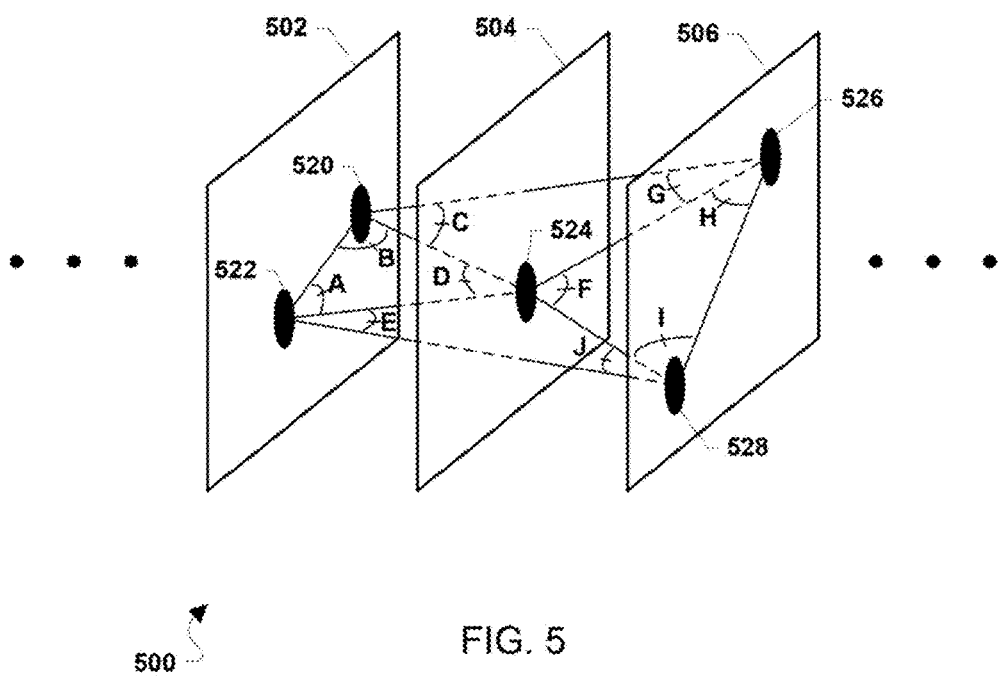
FIG. 5 illustrates relationships among elements of portions of a data set 500 according to various embodiments.

FIG. 5 illustrates one example of a shared data set 500, according to some embodiments. In some embodiments, the shared data set may include two or more portions. Each portion of the shared data set may include one or more elements. In some embodiments, the portions of the shared data set may include a discrete constituent, such as an image, a photograph, video, sound recording, a biometric input, or another such discrete constituent.

In some embodiments, the shared data set may include two or more transitory identities of one of the computing devices. For example, as described above, the first computing device may generate a series of transitory identities over time and may send the transitory identities to the second computing device in the normal conduct of secured communications using methods described herein. The second computing device may store the transitory identities generated by and received from the first computing device. Thus, in some embodiments the shared data set may include the first computing device's transitory identities received over time during secured and/or authenticated communications. In some embodiments, the shared data set may include two or more transitory identities of the second computing device.

The shared data set 500 may include one or more portions, such as portions 502, 504, and 506. Each of the portions 502, 504, and 506 may include one or more elements. For example, portion 502 may include elements 520 and 522, portion 504 may include element 524, and portion 506 may include elements 526 and 528. In some embodiments, the portions 502, 504, and 506 may each be a transitory identity that was generated by a computing device (e.g., one or more of the computing devices 102, 104, 106, and 108). In some embodiments, the portions 502, 504, and 506 may include discrete constituents, such as photographs, sound recordings, fingerprints, biometric data, or other discrete portions.

In some embodiments, the shared data set 500 may be built up over time. For example, a first computing device (e.g., the computing device 102, 104) may generate a plurality of transitory identities over time, store a copy of each transitory identity, and may send a copy of each transitory identity to a second computing device (e.g., the computing device 108), thereby providing the first computing device and the second computing device with a shared data set made up of the transitory identities of the first computing device. In some embodiments, the second computing device may perform similar operations, obtaining transitory identities and providing its transitory identities to the first computing device. In some embodiments, the first and second computing devices may combine the shared transitory identities from each of the first and second computing devices to generate the shared data set. In some embodiments, the first and second computing devices may each compile two discrete shared data sets, made up of transitory identities of the first computing device, and transitory identities of the second computing device, respectively.

In some embodiments, the shared data set 500 may be built up over time by one computing device and then shared with another computing device. For example, the computing device 108 may receive data inputs over time (e.g., the data inputs 140). The data inputs may include one or more discrete constituents, such that the computing device 108 may build up a data set of the data inputs over time. The computing device 108 may then share or send the data set with another computing device (e.g., the computing device 102, 104, 106).

In various embodiments, the elements 520-528 may include information that enables the identification or indexing of each element within a portion. For example, an element may include information identifying a location, position, and/or time of the element within its portion, or any other information that allows the indexing or identification of each selected element.

In various embodiments, the portions 502-506 and/or the elements 520-528 may include data from which one or more relationships to at least one other data element may be determined. For example, the 502-506 and/or the elements 520-528 may be associated with a timestamp. As another example, portions and/or elements may be associated with a variety of data, such as a location, a position, a color, a pitch, a frequency, a biometric aspect, or another aspect of the portion and/or element. The relationship between the two or more elements may include a comparative difference between the two or more elements, such as a time difference, a location difference, a positional difference, a color difference, a pitch difference, a frequency difference, a biometric difference, or another difference.

As another example, the elements 520-528 may have different positions or locations within a portion, or between different portions. The elements 520-528 may also be associated with a different time, as well as with different positions or locations, relative to two or more other elements. In some embodiments, three or more elements may define a relationship of one element to two or more other elements. For example, the position/location differences among elements 520, 522, and 524 may define three angles, angle A, angle B, and angle D. Similarly, the relative position/location and/or time differences among elements 520, 522, 524, 526, and 528 may define additional angles, angles C, E, F, G, H, I, and J. In various embodiments, a relationship may be a relative difference in time, space, distance, or another informational difference, within a portion, among or between portions, and/or within the shared data set 500.

FIGS. 6A-6D illustrate exemplary shared data sets 600a, 600b, 600c, and 600d. A shared data set may include one or more of a variety of types of data, and the examples illustrated in FIGS. 5 and 6A-6D are intended to illustrate the variety of data types and not as limitations.

For example, the shared data set 600a may include fingerprints 602a, 604a, and 606a. The fingerprints 602a-606a may be captured, for example, by a biometric scanning device such as a fingerprint scanner. The fingerprints 602a-606a may be captured over time, such that the fingerprints 602a-606a each constitute a portion of the shared data set 600a. A processor of a computing device (e.g., the computing devices 102-108) may select elements from the portions (e.g., the fingerprints 602a-606a) of the shared data set 600a, such as elements 620a-638a. In some embodiments, the elements 620a-638a may include fingerprint minutiae. The elements 620a-638a may include information that enables a processor of a computing device to identify or index each element within a portion (e.g., within one of the fingerprints 602a-606a), such as information identifying a location or position of the element within its portion. Further, each portion may be associated with a timestamp or another time element.

The portions (e.g., the fingerprints 602a-606a) and/or the elements 620a-638a may include data from which one or more relationships to at least one other data element may be determined, such as position, location, and/or time information. In some embodiments, the portions and/or elements may include data from which one or more relationships among the elements may be determined. In some embodiments, the relationships may be based on one or more comparative differences between or among the elements.

As another example, the shared data set 600b may include sound recordings 602b, 604b, and 606b. The sound recordings may be captured, for example, by a microphone or similar device, or the sound recordings may be received electronically by a processor of a computing device (e.g., the computing devices 102-108) from such a device. The sound recordings 602b-606b may be captured over time, and may include or be associated with time information. Each of the sound recordings 602b-606b may constitute a portion of the shared data set 600b. Additionally, or alternatively, a single recording (e.g., one of 602b, 604b, or 606b) may be divided into portions, for example, portions of a certain time duration, portions divided by frequency range, portions divided by amplitude ranges, and other divisions.

A processor of a computing device may select elements from the portions of the sound recordings 602b-606b, such as elements 620b-630b. The elements 620b-630b may include information that enables the identification or indexing of each element within a sound recording, such as information identifying a location or position of the element within its portion. Each element 620b-630b may be associated with timestamp or another time element and/or other information, such as frequency, a pitch, and amplitude, a rate of attack, a rate of decay, a duration of sustain, The portions (e.g., the one or more sound recordings 602b) and/or the elements 620b-630b may include data from which one or more relationships to at least one other data element may be determined, such as position, location, and/or time information. In some embodiments, the portions and/or elements may include data from which the processor of a computing device may determine one or more relationships among the elements. In some embodiments, the relationships may be based on one or more comparative differences between or among the elements.

Figure 6A:
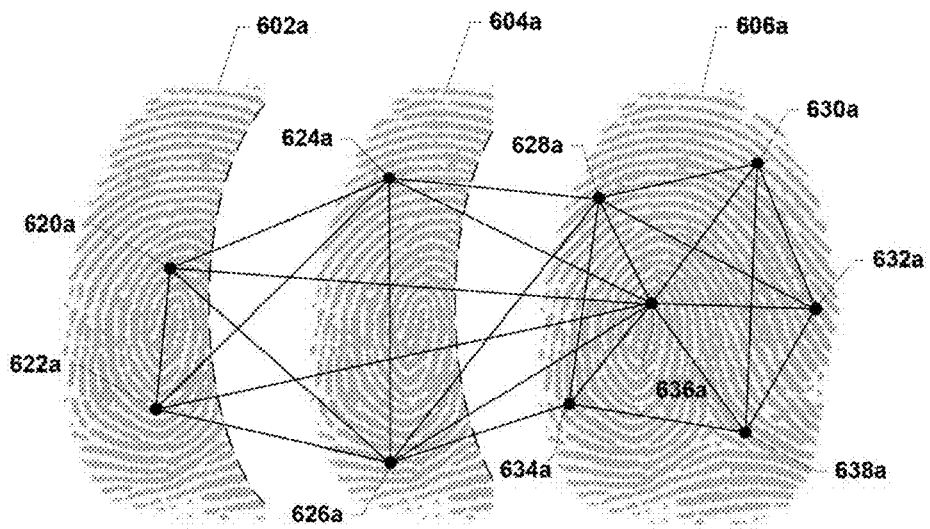
FIGS. 6A-6D illustrate relationships among elements of portions of shared data sets 600a-600d according to various embodiments.
Figure 6B:
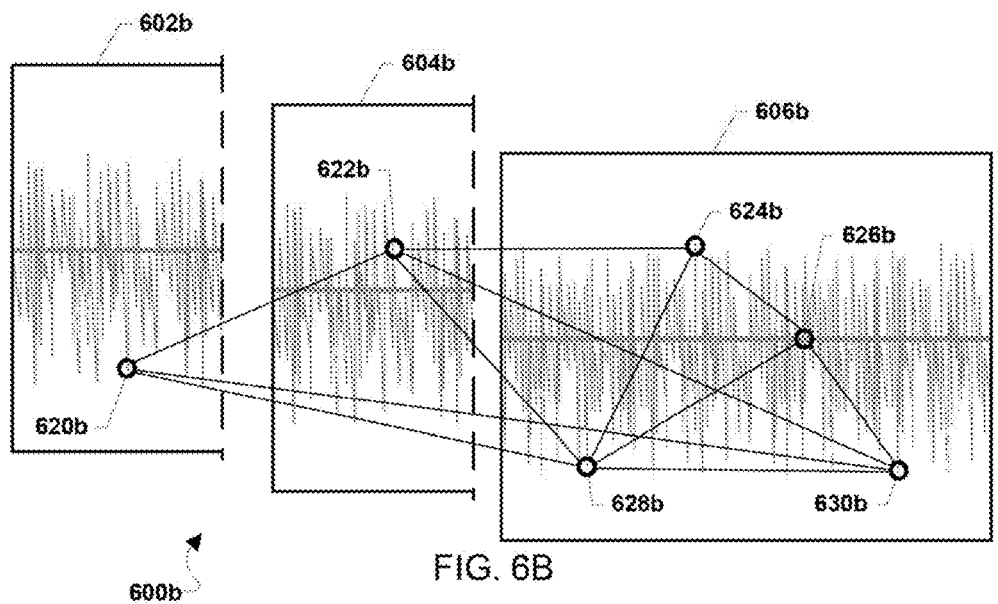
Figure 6C:
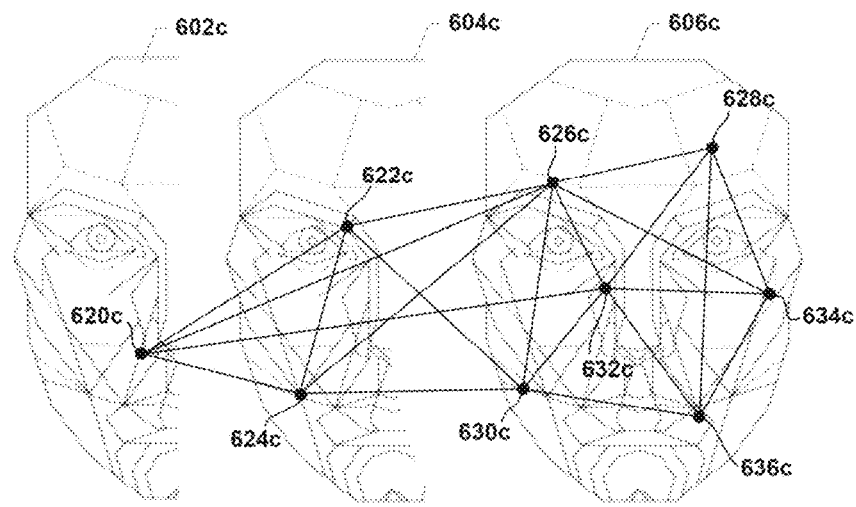
Figure 6D:
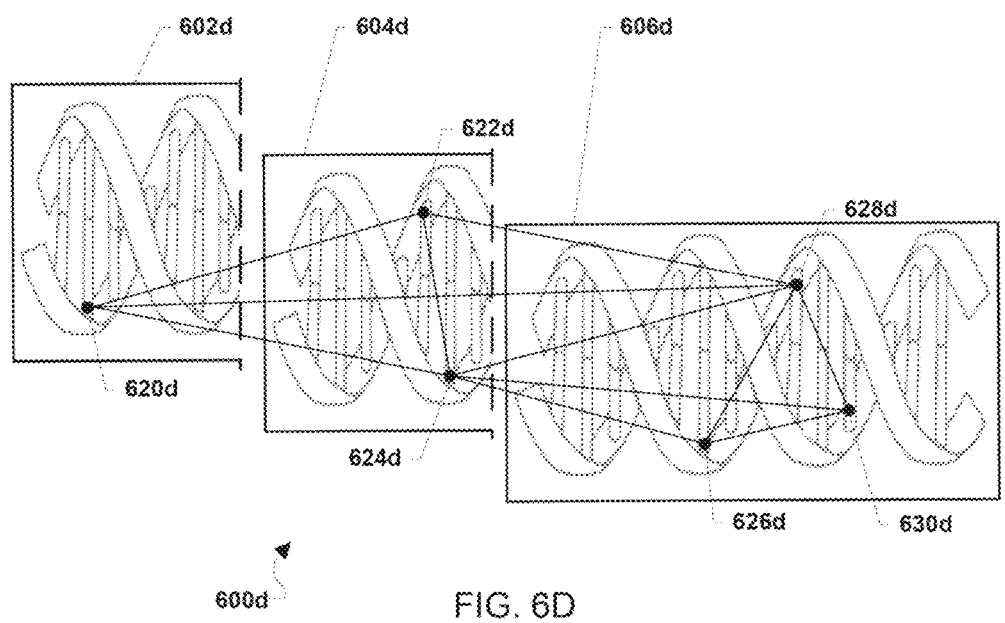

As another example, the shared data set 600c may include images 602c, 604c, and 606c. The images 602c-606c may be of, for example, a face as illustrated in FIG. 6c, but in various embodiments the images 602a-606c may be any images. The images 602a-606c may be captured, for example, by a camera or another image receiving device. The images 602a-606c may be captured over time, such that the images 602a-606c each constitute a portion of the shared data set 600a. A processor of a computing device (e.g., the computing devices 102-108) may select elements from the portions (e.g., the images 602a-606c) of the shared data set 600c, such as elements 620c-636c. For example, the processor of the computing device may select the elements 620c-636c using a facial recognition or other similar system. The elements 620c-636c may include information that enables a processor of a computing device to identify or index each element within a portion (e.g., within one of the images 602a-606c), such as information identifying a location or position of the element within its portion. Further, each portion may be associated with a timestamp or another time element.

The portions (e.g., the images 602a-606c) and/or the elements 620c-636c may include data from which one or more relationships to at least one other data element may be determined, such as position, location, and/or time information. In some embodiments, the elements 620c-636c may be associated with image information, such as color, tint, hue, grayscale, RGB information, Pantone color number, digital color code (e.g., hypertext markup language color code), saturation, brightness, contrast, or other image information. In some embodiments, the portions and/or elements may include data from which one or more relationships among the elements may be determined. In some embodiments, the relationships may be based on one or more comparative differences between or among the elements. In some embodiments, the comparative differences may include differences in image information, including relative, linear, and/or numerical differences in information indicating color, tint, hue, etc.

As another example, the shared data set 600d may include one or more biometric data units or constituents, such as DNA samples 602d, 604d, and 606d. Biometric data may be captured by an appropriate scanner or capture device and received by a processor of a computing device (e.g., the computing devices 102-108). The biometric data may be captured over time, and may include or be associated with time information. The shared data set 600d may include two or more biometric data constituents or units, each of which may constitute a portion of the shared data set (e.g., two or more discrete biometric samples). Additionally or alternatively, a biometric sample may be divided into portions, which divisions may be determined based on the information available in the biometric sample. For example, the DNA samples 602d, 604d, and 606d may be divided into portions of a certain base-pair length or number, a certain length of the DNA backbone, by type of nucleotide (e.g., adenine, guanine, cytosine, or thymine), by type of base pair (e.g., adenine-thymine, cytosine-guanine), or another division.

A processor of a computing device may select elements from the portions of the biometric data unit 600d, such as elements 620d-630d. The elements 620d-630d may include information that enables the identification or indexing of each element within a biometric data, such as information identifying a location or position of the element within its portion, such as a position along the DNA strand 602d. Each element 620d-630d may be associated with timestamp or another time element.

The portions (e.g., the one or more biometric data units 602d) and/or the elements 620d-630d may include data from which one or more relationships to at least one other data element may be determined, such as position, location, and/or time information. In some embodiments, the portions and/or elements may include data from which the processor of a computing device may determine one or more relationships among the elements. In some embodiments, the relationships may be based on one or more comparative differences between or among the elements.

FIG. 7 illustrates a method 700 of authenticating a first computing device (e.g., the computing device 102, 104, 184, 186, and 200 of FIGS. 1B-2) to a second computing device (e.g., the computing device e.g., 108, 188, and 200 of FIGS. 1B-2). With reference to FIGS. 1A-7, the method 700 may be implemented by a processor (e.g., the processor 202 and/or the like) of a computing device (e.g., the computing devices 102-108, 184-188, and 200).

In block 702, the processor of the first computing device may select elements from the shared data set. For example, the processor of the first computing device may select elements 520, 522, 524, 526, and 528 from among the portions 502, 504, and 506 of the shared data set 500. As another example, the processor of the first computing device may select elements from among the shared data sets 600*a*, 600*b*, 600*c*, or 600*d*. In some embodiments, the processor of the first computing device may select the elements randomly from the shared data set.

In block 704, the processor of the first computing device may generate a rule set indicating the selected elements. In some embodiments, the rule set may identify the selected elements from the shared data set. For example, the processor may generate a rule set identifying the elements selected from the shared data set.

In some embodiments, the processor may generate the rule set based on the one or more relationships between or among the selected elements of the shared data set. The relationship between the two or more elements may include a comparative difference between the two or more elements, such as a time difference, a location difference, a positional difference, a color difference, a pitch difference, a frequency difference, or another difference. As another example, the relationships may be defined by comparative differences among three or more elements. For example, the position/location differences among the elements 520, 522, and 524 may define three angles, angle A, angle B, and angle D. Similarly, the relative position/location and/or time differences among elements 520, 522, 524, 526, and 528 may define additional angles, angles C, E, F, G, H, I, and J. In some embodiments, the processor of the first computing device may generate the rule set based on one or more relationships among the selected elements of, for example, the shared data sets 600*a*, 600*b*, 600*c*, or 600*d*. In various embodiments, a relationship may be a relative difference in time, space, distance within a portion, or another informational difference. The relationship(s) between or among elements may be determined among and/or between portions of the shared data set.

In some embodiments, the processor may generate the rule set using a combination of identifiers of the selected elements and one or more relationships among the selected elements. In some embodiments, the rule set may include an identifier of only one of the selected elements and relationships of the one selected elements and the other selected elements. For example, the rule set may include an identifier of the element 520, and information about the relationships of the element 520 to the other selected elements (elements 522-528) sufficient to enable another computing device to identify the other selected elements (elements 522-528) using only the element 520 and the information about the relationships of the element 520 and the other selected elements. In some embodiments, the processor may generate a rule set using a combination of identifiers of the selected elements and one or more relationships among the selected elements of, for example, the shared data sets 600*a*, 600*b*, 600*c*, or 600*d*.

In some embodiments, the generated rule set may be formatted as a string of information organized according to an organizational logic. The more efficient the organizational logic, the smaller the generated rule set may be, enabling faster generation, transmission, and processing by receiving computing device, thereby decreasing a burden on processors of the computing devices as well as the transport infrastructure.

In block 706, the processor of the first computing device may generate a first result based on the selected elements. In some embodiments, the first result may include a string of data. In some embodiments, the first result may include a value based on the information in the selected elements of the shared data set. In some embodiments, the processor of the first computing device may perform a transform of the information of the selected elements, such as generating a hash of values within the information. In some embodiments, the processor of the first computing device may generate a data string based on the information of the selected elements and may perform a transform (e.g., generate a hash) of the information of the selected elements to generate the first result.

In block 708, the processor the first computing device may send the rule set to the second computing device (e.g., the computing device 108). In some embodiments, the first computing device may send a verification request including the rule set to the second computing device.

In block 710, a processor of the second computing device may receive the rule set (or verification request) from the first computing device.

In block 712, the processor of the second computing device may extract the selected elements from the shared data set using the rule set. For example, the processor of the second computing device may use identifiers of each of the selected elements 520-528 to extract the selected elements from the shared data set stored at the second computing device. As another example, the processor of the second computing device may use one or more identifiers of one of the selected elements (e.g., one or more of the elements 520-528, or one or more of the elements of the shared data set 600*a*, 600*b*, 600*c*, or 600*d*) and one or more relationships among the selected elements to extract the selected elements from the shared data set.

In block 714, the processor of the second computing device may generate a second result based on the selected elements. In some embodiments, the second result may include a string of data. In some embodiments, the second result may include a value based on the information in the selected elements of the shared data set. In some embodiments, the processor of the second computing device may perform a transform of the information of the selected elements, such as generating a hash of values within the information. In some embodiments, the processor of the second computing device may generate a data string based on the information of the selected elements and may perform a transform (e.g., generate a hash) of the information of the selected elements to generate the first result. In various embodiments, the processor of the second computing device may use the same method of generating the second result that the first computing device uses to generate the first result.

In block 716, the processor of the second computing device may send the second result to the first computing device.

In block 718, the processor of the first computing device may receive the second result from the second computing device.

In determination block 720, the processor of the first computing device may determine whether the first result matches the second result. For example, the processor may determine whether a product of the first result and the second result equals zero. As another example, the processor may compare the first result and the second result. In response to determining that the first result does not match the second result (i.e., determination block 720="No"), the processor of the first computing device may determine that the second computing device is not authenticated in block 722.

In block 724, the processor of the first computing device may prevent the first computing device from communicating with the second computing device.

In optional block 726, the processor of the first computing device may send an indication that the second computing device is not authenticated. For example, the first computing device may send the indication to the second computing device. As another example, the first computing device may send the indication to another computing device (e.g., the computing device 106).

In response to determining that the first result matches the second result (i.e., determination block 720="Yes"), the processor of the first computing device may determine that the second computing device is authenticated in block 728.

In block 730, the processor of the first computing device may enable communication with the second computing device.

In optional block 732, the processor of the first computing device may send an indication that the second computing device is authenticated. For example, the first computing device may send the indication to the second computing device. As another example, the first computing device may send the indication to another computing device (e.g., the computing device 106).

The processor of the first computing device may then proceed to the operations of block 302 (FIGS. 3A, 3B, and 3C).

In some embodiments, if the processor of the first computing device enables communication with the second computing device (e.g., block 730), the processor of the second computing device may then proceed to the operations of block 302 (FIGS. 3A, 3B, and 3C). In some embodiments, if the processor of the first computing device sends an indication that the second computing device is authenticated (e.g., block 732), the processor of the second computing device may then proceed to the operations of block 302 (FIGS. 3A, 3B, and 3C).

Figure 8:
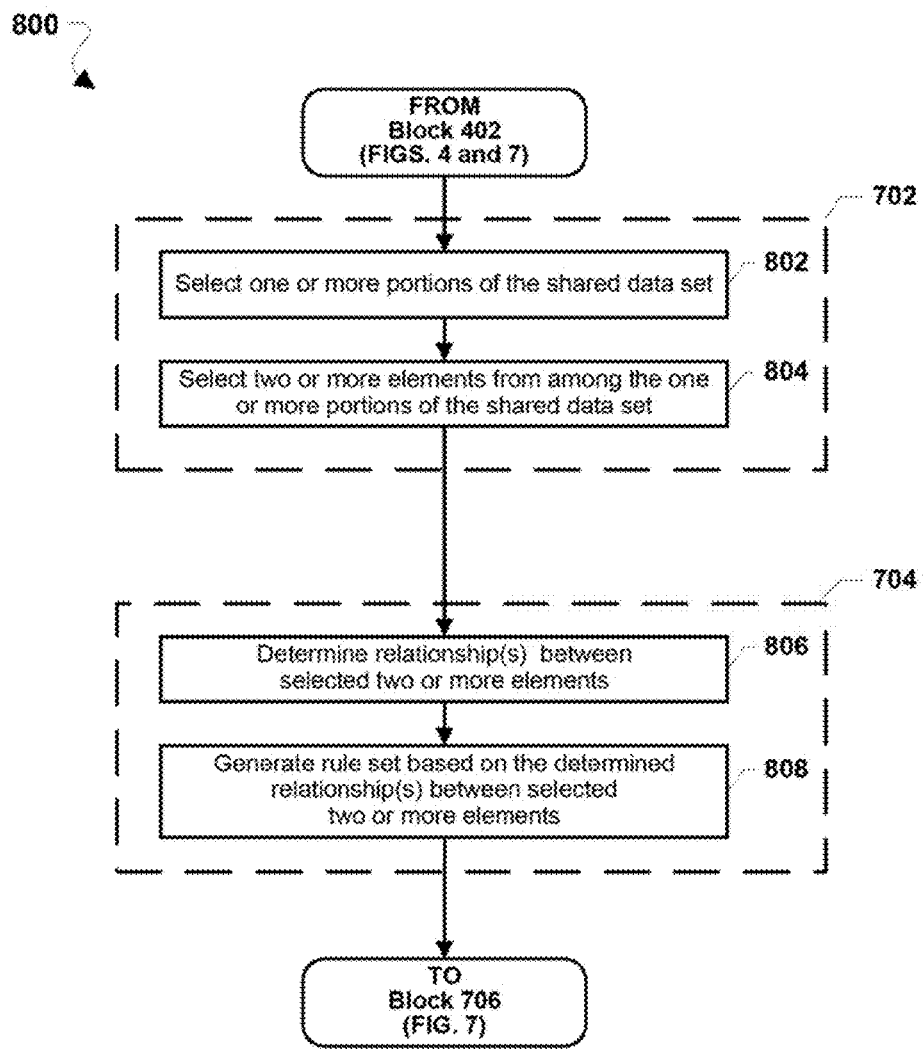
FIG. 8 illustrates a method 800 of operations executed by the first computing device as part of the method 700 according to various embodiments.

FIG. 8 illustrates a method 800 including operations that may be performed in blocks 702 and 704 of the method 700. With reference to FIGS. 1A-8, the method 800 may be implemented by a processor (e.g., the processor 202 and/or the like) of a computing device (e.g., the computing devices 102-108, 184-188, and 200).

After performing the operations of block 402 in FIGS. 4 and 7, the processor of the first computing device may select one or more portions of the shared data set in block 802. For example, the processor may select one or more portions of one of the shared data sets 500 and 600*a*-600*d*.

In block 804, the processor of the first computing device may select two or more elements from among the one or more portions of the shared data set. For example, the processor of the first computing device may select two or more elements from among the shared data sets 500 and 600*a*-600*d* (e.g., the elements 522-528, 620*a*-638*a*, 620*b*-630*b*, 620*c*-636*c*, and 620*d*-630*d*).

In block 806, the processor of the first computing device may determine one or more relationships between the selected two or more elements. In some embodiments, the relationship(s) may be based on one or more comparative differences between or among the elements, such as those described above with respect to shared data sets 500 and 600*a*-600*d*.

In block 808, the processor of the first computing device may generate a rule set based on the determined one or more relationships between the selected two or more elements. For example, the processor may generate a rule set identifying the selected two or more elements. In some embodiments, the processor may generate the rule set based on the one or more relationships between or among the selected elements of the shared data set. The relationship between the two or more elements may include a comparative difference between the two or more elements.

The processor of the first computing device may then perform the operations of block 706 (FIG. 7).

Figure 9:
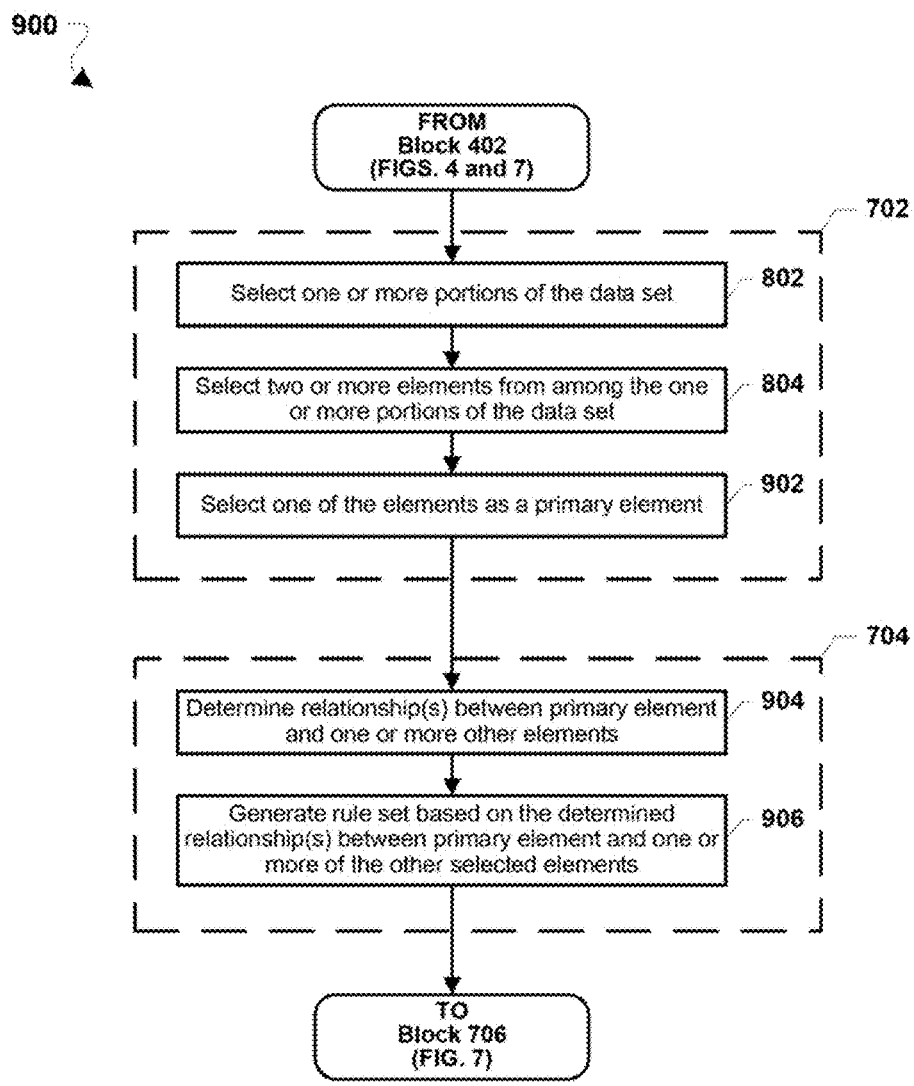
FIG. 9. illustrates a method 900 of operations executed by the first computing device as part of the method 700 according to various embodiments.

FIG. 9 illustrates a method 900 including operations that may be performed in blocks 702 and 704 of the method 700. With reference to FIGS. 1A-9, the method 900 may be implemented by a processor (e.g., the processor 202 and/or the like) of a computing device (e.g., the computing devices 102-108, 184-188, and 200). In blocks 802 and 804, the processor may perform operations of like-numbered blocks of the method 800.

In block 902, the processor of the first computing device may select one of the elements as a primary element. For example, the processor may select a primary element from the elements selected from the shared data sets 500 and 600*a*-600*d* (e.g., the elements 522-528, 620*a*-638*a*, 620*b*-630*b*, 620*c*-636*c*, and 620*d*-630*d*).

In block 904, the processor of the first computing device may determine one or more relationships between the selected primary element and one or more other elements of the shared data set. In some embodiments, the relationship(s) may be based on one or more comparative differences between or among the elements, such as those described above with respect to shared data sets 500 and 600*a*-600*d*.

In block 906, the processor of the first computing device may generate a rule set based on the determined one or more relationships between the selected primary element and the one or more other elements. For example, the processor may generate a rule set identifying the primary element and one or more relationships between or among the primary element and the one or more other elements of the shared data set. The relationship(s) may include one or more comparative differences between and/or among the elements. For example, the rule set may include an identifier of the element 520, and information about the relationships of the element 520 to the other selected elements (elements 522-528) sufficient to enable another computing device to identify the other selected elements (elements 522-528) from the shared data set using only the element 520 and the information about the relationships of the element 520 and the other selected elements.

The processor of the first computing device may then perform the operations of block 706 (FIG. 7).

Figure 10:
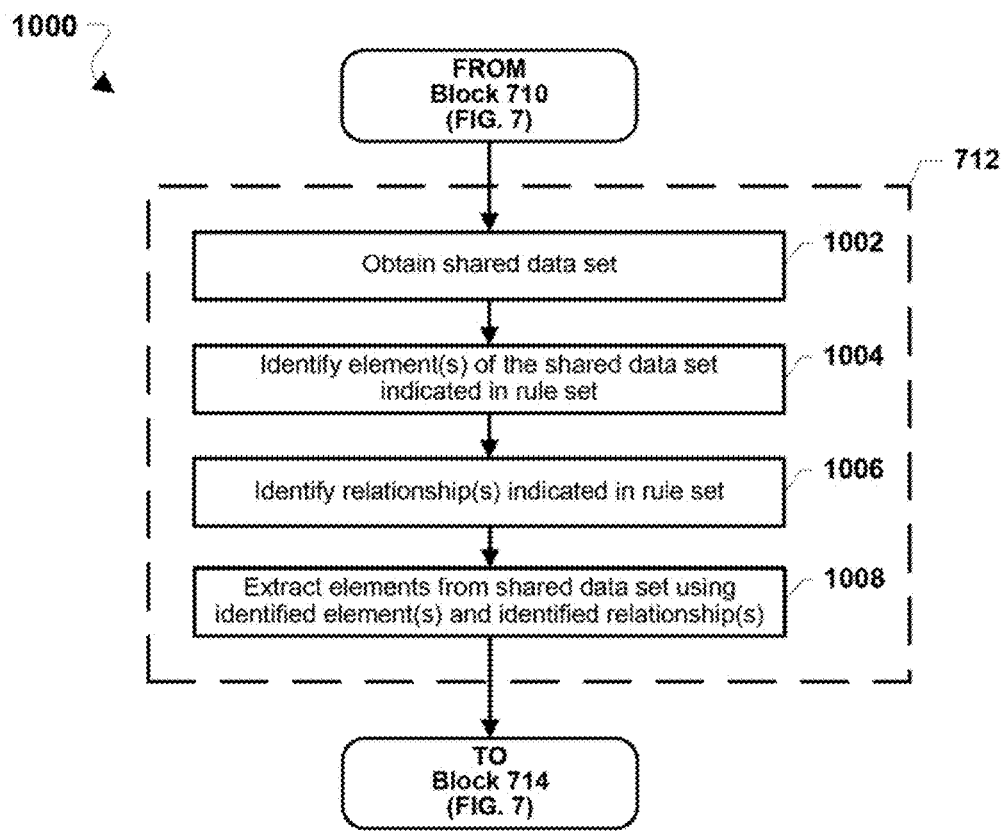
FIG. 10 illustrates a method 1000 of operations executed by the second computing device as part of the method 700 according to various embodiments.

FIG. 10 illustrates a method 1000 including operations that may be performed in block 712 of the method 700. With reference to FIGS. 1A-10, the method 1000 may be implemented by a processor (e.g., the processor 202 and/or the like) of a computing device (e.g., the computing devices 102-108, 184-188, and 200).

After performing the operations of block 710 in FIG. 7, the processor of the second computing device may obtain the shared data set in block 1002. For example, the processor of the second computing device may recall the shared data set from memory.

In block 1004, the processor of the second computing device may identify one or more elements of the shared data set that are indicated in the rule set. For example, the rule set may identify one or more selected elements of the shared data set. As another example, the rule set may identify a primary element of the shared data set.

In block 1006, the processor of the second computing device may identify one or more relationships indicated in the rule set. The one or more relationships may be based on one or more comparative differences of one or more of the elements of the shared data set. The one or more relationships may be related to the primary element of the shared data set.

In block 1008, the processor of the second computing device may extract the elements from the shared data set using the identified one or more elements and/or the one or more identified relationships. In some embodiments, the identified one or more elements and/or the one or more identified relationships provide sufficient information to enable the processor of the second computing device to identify the selected elements of the shared data set.

The processor of the second computing device may then perform the operations of block 714 (FIG. 7).

Figure 11:
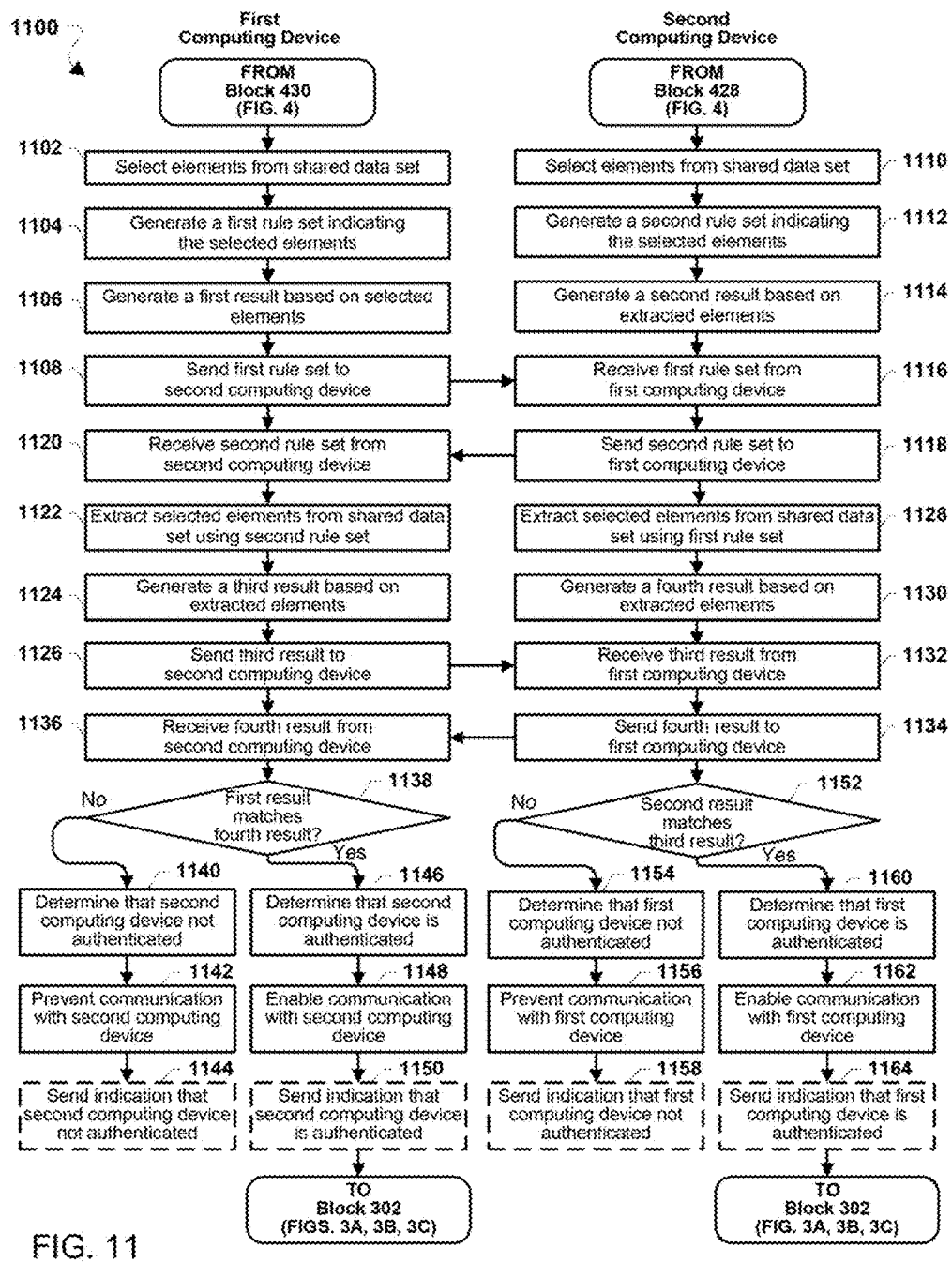
FIG. 11 illustrates a method 1100 of bi-directionally authenticating a first computing device and a second computing device according to various embodiments.

FIG. 11 illustrates a method 1100 of bi-directionally authenticating a first computing device and a second computing device according to some embodiments. With reference to FIGS. 1A-11, the method 1100 may be implemented by a processor (e.g., the processor 202 and/or the like) of a computing device (e.g., the computing devices 102-108, 184-188, and 200). In blocks 402 and 404, the processors may perform operations of like-numbered blocks of the method 400.

In some embodiments, the first computing device and the second computing device may share two or more data sets. For example, the first computing device may generate or compile a first data set, and the first computing device may share the first data set with the second computing device. Similarly, the second computing device may generate or compile a second data set, and may share the second data set with the first computing device. There is no limitation on the number of data sets any computing device may store or share with another computing device (provided that the data sets are shared data sets). Thus, while the operations described below with respect to the method 1100 referred to a shared data set, in some embodiments the operations of the method 1100 may be performed using two (or more) shared data sets.

In some embodiments, sharing a data set may include sharing (i.e. sending and/or receiving) one or more transitory identities generated by or obtained from a computing device (e.g., operations 302-306 of FIG. 3).

In block 1102, the processor of the first computing device may select a first set of elements from a shared data set (e.g., shared with the second computing device). For example, the processor of the first computing device may select elements from among the portions of the shared data sets 500 and 600a-600d.

In block 1104, the processor of the first computing device may generate a first rule set indicating the selected elements. In some embodiments, the rule set may identify the selected elements from the shared data set. In some embodiments, the processor may generate the rule set based on the one or more relationships between or among the selected elements of the shared data set. The relationship between the two or more elements may include a comparative difference between the two or more elements. In some embodiments, the processor may generate the rule set using a combination of identifiers of the selected elements and one or more relationships among the selected elements. In some embodiments, the rule set may include an identifier of only one of the selected elements and relationships of the one selected elements and the other selected elements.

In block 1106, the processor of the first computing device may generate a first result based on the selected elements. In some embodiments, the first result may include a string of data. In some embodiments, the first result may include a value based on the information in the selected elements of the shared data set. In some embodiments, the processor of the first computing device may perform a transform of the information of the selected elements, such as generating a hash of values within the information. In some embodiments, the processor of the first computing device may generate a data string based on the information of the selected elements and may perform a transform (e.g., generate a hash) of the information of the selected elements to generate the first result.

In block 1108, the processor the first computing device may send the first rule set to the second computing device.

In block 1110, the processor of the second computing device may select a second set of elements from a shared data set (e.g., shared with the first computing device). For example, the processor of the second computing device may select elements from among the portions of the shared data sets 500 and 600a-600d.

In block 1112, the processor of the second computing device may generate a second rule set indicating the selected elements. In some embodiments, the rule set may identify the selected elements from the shared data set. In some embodiments, the processor may generate the rule set based on the one or more relationships between or among the selected elements of the shared data set. The relationship between the two or more elements may include a comparative difference between the two or more elements. In some embodiments, the processor may generate the rule set using a combination of identifiers of the selected elements and one or more relationships among the selected elements. In some embodiments, the rule set may include an identifier of only one of the selected elements and relationships of the one selected elements and the other selected elements.

In block 1114, the processor of the second computing device may generate a second result based on the selected elements. In some embodiments, the second result may include a string of data. In some embodiments, the second result may include a value based on the information in the selected elements of the shared data set. In some embodiments, the processor of the second computing device may perform a transform of the information of the selected elements, such as generating a hash of values within the information. In some embodiments, the processor of the second computing device may generate a data string based on the information of the selected elements and may perform a transform (e.g., generate a hash) of the information of the selected elements to generate the first result.

In block 1116, the processor of the second computing device may receive the first rule set from the first computing device.

In block 1118, the processor of the second computing device may send the second rule set to the first computing device.

In block 1120, the processor of the first computing device may receive the second rule set from the second computing device.

In block 1122, the processor of the first computing device may extract the selected elements (i.e., the elements selected by the second computing device) from the shared data set using the second rule set. For example, the processor of the first computing device may use identifiers of each of the selected elements to extract the selected elements from the shared data set stored at the first computing device. As another example, the processor of the first computing device may use one or more identifiers of one of the selected elements and one or more relationships among the selected elements to extract the selected elements from the shared data set.

In block 1124, the processor of the first computing device may generate a third result based on the selected elements. In some embodiments, the third result may include a string of data. In some embodiments, the third result may include a value based on the information in the selected elements of the shared data set. In some embodiments, the processor of the first computing device may perform a transform of the information of the selected elements, such as generating a hash of values within the information. In some embodiments, the processor of the first computing device may generate a data string based on the information of the selected elements and may perform a transform (e.g., generate a hash) of the information of the selected elements to generate the third result.

"transformation" needs to be defined more broadly=any mathematical operation, number shifting, any computation or operation; translate to any language;

In various embodiments, the processor of the first computing device may use the same method of generating the third result that the second computing device uses to generate the second result.

In block 1126, the processor of the first computing device may send the third result to the second computing device.

In block 1128, the processor of the second computing device may extract the selected elements (i.e., the elements selected by the first computing device) from the shared data set using the first rule set. For example, the processor of the second computing device may use identifiers of each of the selected elements to extract the selected elements from the shared data set stored at the second computing device. As another example, the processor of the second computing device may use one or more identifiers of one of the selected elements and one or more relationships among the selected elements to extract the selected elements from the shared data set.

In block 1130, the processor of the second computing device may generate a fourth result based on the selected elements. In some embodiments, the fourth result may include a string of data. In some embodiments, the fourth result may include a value based on the information in the selected elements of the shared data set. In some embodiments, the processor of the second computing device may perform a transform of the information of the selected elements, such as generating a hash of values of the information. In some embodiments, the processor of the second computing device may generate a data string based on the information of the selected elements and may perform a transform of the information of the selected elements to generate the fourth result. In various embodiments, the processor of the second computing device may use the same method of generating the fourth result that the first computing device uses to generate the first result.

In block 1132, the processor of the second computing device may receive the third result from the first computing device.

In block 1134, the processor of the second computing device may send the fourth result to the first computing device.

In block 1136, the processor of the first computing device may receive the fourth result from the second computing device.

In determination block 1138, the processor of the first computing device may determine whether the first result matches the fourth result. For example, the processor of the first computing device may determine whether the first result that is generated by the processor of the first computing device using the selected elements from the shared data set matches the fourth result that is generated by the processor of the second computing device using the selected elements from the shared data set. In some embodiments, the comparison may include determining whether the difference of the first result and the fourth result equals zero.

In response to determining that the first result does not match the fourth result (i.e., determination block 1138="No"), the processor of the first computing device may determine that the second computing device is not authenticated in block 1140.

In block 1142, the processor of the first computing device may prevent the first computing device from communicating with the second computing device.

In optional block 1144, the processor of the first computing device may send an indication that the second computing device is not authenticated. For example, the first computing device may send the indication to the second computing device. As another example, the first computing device may send the indication to another computing device.

In response to determining that the second result matches the third result (i.e., determination block 1138="Yes"), the processor of the first computing device may determine that the second computing device is authenticated in block 1146.

In block 1148, the processor of the first computing device may enable communication with the second computing device.

In optional block 1150, the processor of the first computing device may send an indication that the second computing device is authenticated. For example, the first computing device may send the indication to the second computing device. As another example, the first computing device may send the indication to another computing device.

In various embodiments, the processor of the first computing device may then proceed to block 302 (FIGS. 3A, 3B, and 3C)

In determination block 1152, the processor of the second computing device may determine whether the second result matches the third result. In response to determining that the second result does not match the third result (i.e., determination block 1152="No"), the processor of the second computing device may determine that the first computing device is not authenticated in block 1154.

In block 1156, the processor of the second computing device may prevent the second computing device from communicating with the first computing device.

In optional block 1158, the processor of the second computing device may send an indication that the first computing device is not authenticated. For example, the second computing device may send the indication to the first computing device. As another example, the second computing device may send the indication to another computing device.

In response to determining that the second result matches the third result (i.e., determination block 1152="Yes"), the processor of the second computing device may determine that the first computing device is authenticated in block 1160.

In block 1162, the processor the second computing device may enable communication with the first computing device.

In optional block 1164, the processor of the second computing device may send an indication that the first computing device is authenticated. For example, the second computing device may send the indication to the first computing device. As another example, the second computing device may send the indication to another computing device (e.g., the computing device 106).

In various embodiments, the processor of the second computing device may then proceed to block 302 (FIGS. 3A, 3B, and 3C)

Figure 12:
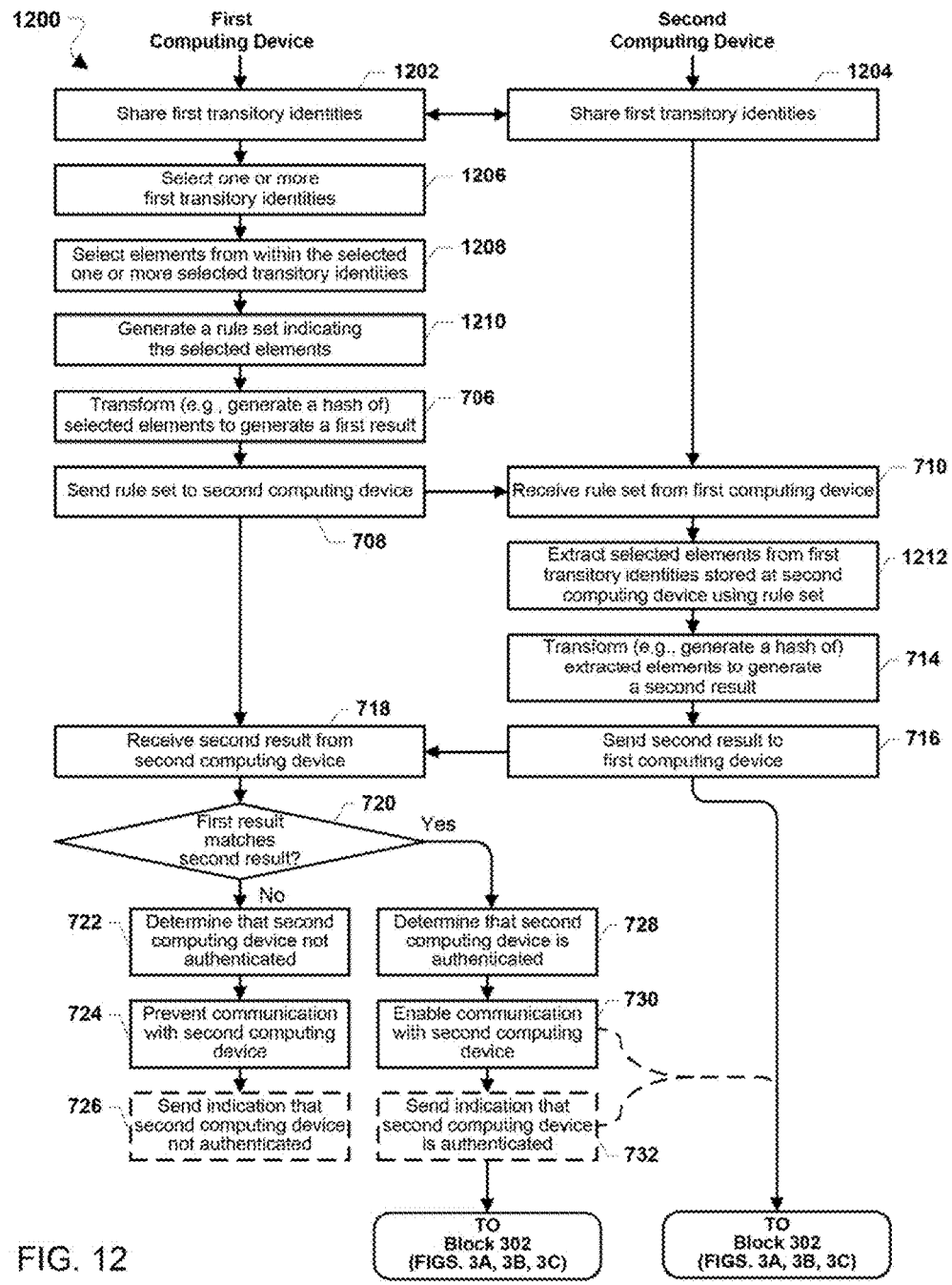
FIG. 12 illustrates a method 1200 of authenticating a first computing device to a second computing device according to various embodiments.

FIG. 12 illustrates a method 1200 of authenticating a first computing device (e.g., the computing device 102, 104, 184, 186, and 200 of FIGS. 1B-2) to a second computing device (e.g., the computing device e.g., 108, 188, and 200 of FIGS. 1B-2). With reference to FIGS. 1A-12, the method 1200 may be implemented by a processor (e.g., the processor 202 and/or the like) of a computing device (e.g., the computing devices 102-108, 184-188, and 200). In blocks 706-732, the processors may perform operations of like-numbered blocks of the method 700.

In blocks 1202 and 1204, the processors of the first computing device and the second computing device may share first transitory identities. For example, the first computing device may generate or obtain one or more first transitory identities, and the first computing device may share (e.g., transmit to) the one or more first transitory identities with the second computing device, as discussed above. In some embodiments, the first computing device may share the first transitory identities with the second computing device over time. In some embodiments, the shared first transitory identities (i.e., stored at both the first computing device and the second computing device) may make up a shared data set. In some embodiments, the operations of blocks 1202 and 1204 may include one or more operations of the method 400, to dynamically alter the shared data set.

In block 1206, the processor of the first computing device may select one or more first transitory identities. In some embodiments, the selected first transitory identities may be considered portions of the shared data set of the first transitory identities. In some embodiments, the selected first transitory identities may be previously-used first transitory identities. For example, the selected first transitory identities may have been used to authenticate the first computing device in a previously-performed authentication operation.

In block 1208, the processor of the first computing device may select elements from within the selected one or more transitory identities. In some embodiments, the selected elements may include any information included in the selected one or more transitory identities.

In block 1210, the processor of the first computing device may generate a rule set indicating the selected elements. In some embodiments, the rule set may identify the selected elements from the selected one or more first transitory identities. In some embodiments, the processor may generate the rule set based on one or more relationships between or among the selected elements of the selected transitory identities.

In block 706, the processor of the first computing device may transform the selected elements to generate a first result. In block 412, the processor the first computing device may send the rule set and the first result to a second computing device (e.g., the computing device 108). In block 414, a processor of the second computing device may receive the rule set and the first result.

In block 1212, the processor of the second computing device may extract the selected elements from the first transitory identity stored at the second computing device using the rule set. For example, the processor of the second computing device may use identifiers of each of the selected elements to extract the selected elements from the first transitory identities stored at the second computing device. As another example, the processor of the second computing device may use one or more identifiers of one of the selected elements and one or more relationships among the selected elements to extract the selected elements from the first transitory identities.

The processor of the second computing device may transform the extracted elements to generate a second result in block 714, and may send the second result to the first computing device in block 716. The processor of the first computing device may receive the second result from the second computing device in block 718, and may determine whether the first result matches the second result in determination block 720, substantially as described above.

Figure 13:
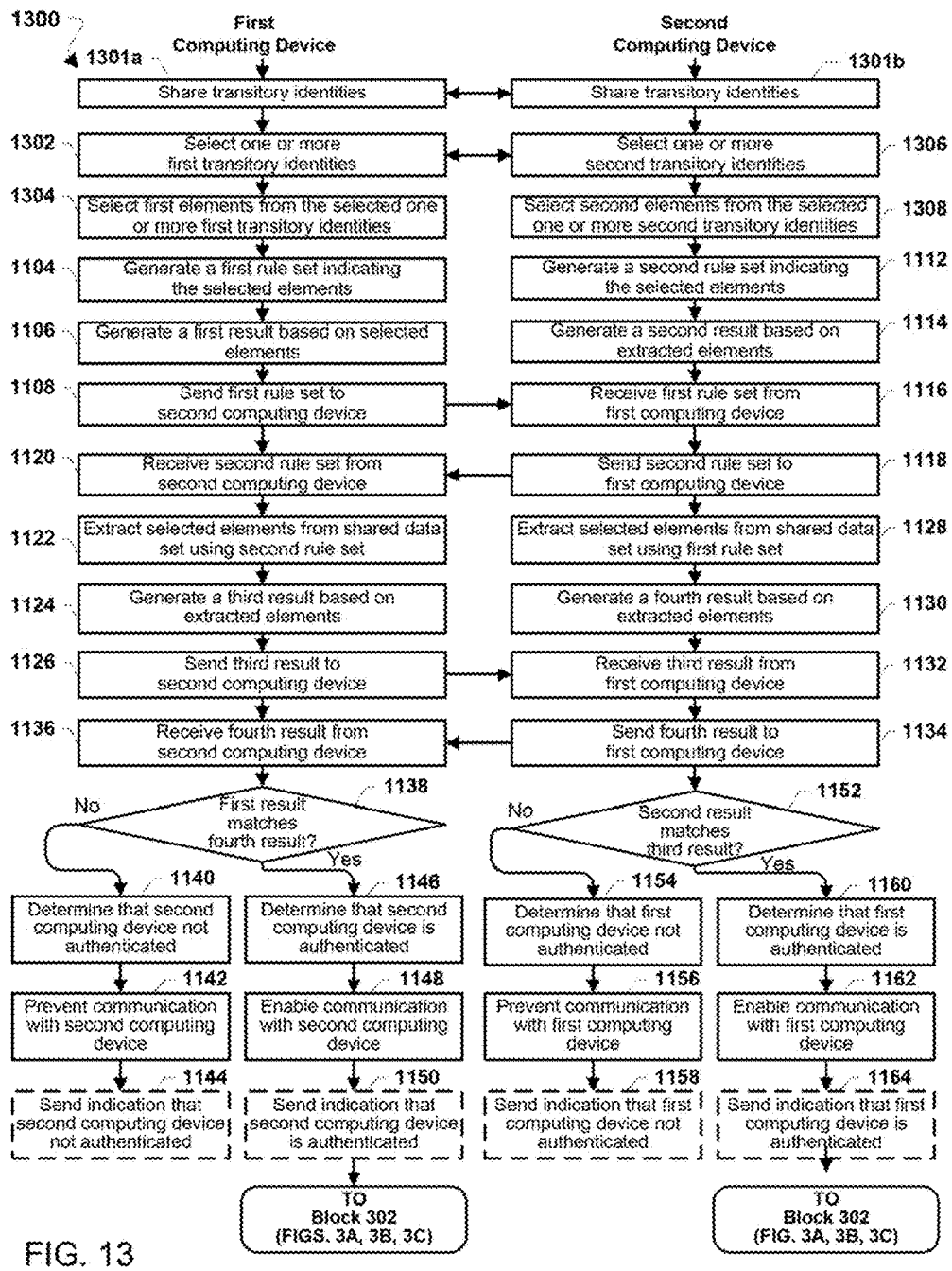
FIG. 13 illustrates a method 1300 of bi-directionally authenticating a first computing device and a second computing device according to various embodiments.

FIG. 13 illustrates a method 1300 of bi-directionally authenticating a first computing device and a second computing device according to some embodiments. With reference to FIGS. 1A-13, the method 1300 may be implemented by a processor (e.g., the processor 202 and/or the like) of a computing device (e.g., the computing devices 102-108, 184-188, and 200). In blocks 1104-1164, the processors may perform operations of like-numbered blocks of the method 1100.

In blocks 1301a and 1301b, the processor of the first computing device and the processor of the second computing device may share transitory identities. For example, the first computing device may generate or obtain one or more first transitory identities, and the first computing device may share (e.g., transmit to) the one or more first transitory identities with the second computing device, as described above. In some embodiments, the first computing device may share the first transitory identities with the second computing device over time. In some embodiments, the shared first transitory identities (i.e., stored at both the first computing device and the second computing device) may make up a shared data set.

Additionally or alternatively, in some embodiments, the second computing device may generate or obtain one or more second transitory identities, and the second computing device may share (e.g., transmit to) the one or more second transitory identities with the first computing device, as discussed above. In some embodiments, the second computing device may share the second transitory identities with the first computing device over time. In some embodiments, the shared second transitory identities (i.e., stored on both the first computing device and the second computing device) may make up a second shared data set.

In the operations of block 1306, in some embodiments, the second computing device may select the second transitory identities from a shared data set made up of the first transitory identities received from the first computing device. Further, in some embodiments, the second computing device may select the second transitory identities from a shared data set made up of the second transitory identities obtained by the second computing device and shared with the first computing device.

Thus, in some embodiments, the first computing device and the second computing device may share two or more data sets.

In some embodiments, the operations of blocks 1301a and 1301b, may include one or more operations of the method 400, to dynamically alter the shared data set(s).

In block 1302, the processor of the first computing device may select one or more first transitory identities. In some embodiments, the first transitory identities may have been shared with the second computing device, such that the first transitory identities are a data set shared by the first computing device and the second computing device. In some embodiments, the selected first transitory identities may be portions of the shared data set of the first transitory identities.

In block 1304, the processor of the first computing device may select first elements from the selected one or more first transitory identities.

In block 1104, the processor of the first computing device may generate a first rule set indicating the selected first elements.

In block 1306, the processor of the second computing device may select one or more second transitory identities. In various embodiments, the first computing device and the second computing device may share one or more data sets. In some embodiments, the processor of the second computing device may select the second transitory identities from a first shared data set that is shared with the first computing device. In some embodiments, the processor of the second computing device may select the second transitory identities from a second shared data set that is shared with the first computing device (while the first computing device may select the one or more first transitory identity from the first data set shared by both the first computing device and the second computing device).

In block 1308, the processor of the second computing device may select second elements from the selected one or more second transitory identities.

In block 1112, the processor of the second computing device may generate a second rule set indicating the selected second elements.

In block 1310, the processor of the first computing device may extract the selected elements (i.e., the elements selected by the second computing device) from the second transitory identities using the received second rule set. For example, the processor of the first computing device may use identifiers of each of the selected elements to extract the selected elements from the second transitory identities stored at the first computing device. As another example, the processor of the first computing device may use one or more identifiers of one of the selected elements and one or more relationships among the selected elements to extract the selected elements from the second transitory identities.

In block 1312, the processor of the second computing device may extract the selected elements (i.e., the elements selected by the first computing device) from the first transitory identities using the first rule set. For example, the processor of the second computing device may use identifiers of each of the selected elements to extract the selected elements from the first transitory identities stored at the second computing device. As another example, the processor of the second computing device may use one or more identifiers of one of the selected elements and one or more relationships among the selected elements to extract the selected elements from the first transitory identities.

Various embodiments enhance and improve the verification of computing devices on a communication network by utilizing a dynamically changing shared information context. The information context may include, for example, a shared data set. In some embodiments, the shared data set may include one or more transitory identities of a computing device that are shared during authenticated and/or secure transactions. In some embodiments, the transitory identities may have been previously used to authenticate one or both of the two computing devices. This enables the shared data set to be compiled over time in a manner that is unique to the two computing devices. Building up the shared data set in this manner enables two computing devices to possess a shared data set that is unique to the historical context of communications between and among the two computing devices. Additionally, such a shared data set changes frequently in an unpredictable manner, thereby ensuring that the computing devices can reliably authenticate one another and recognize imposters even in the event one of the computing devices has been compromised and the shared data set stolen. The shared data set may be changed by one or both of the computing devices occasionally, periodically, and/or upon the occurrence of a triggering event (e.g., on suspicion that one or the other computing device has been compromised. Changing or altering the shared data set may include reordering the data set, adding information to the data set, and/or subtracting information from the data set.

Various embodiments may improve the function of each participating computing device, as well as the overall communication system, by enabling the authentication of the participating communication devices. Various embodiments improve the function of each participating computing device in a wide range of communications and/or information transaction contexts, including healthcare record management, secure communications (e.g., government, business, intelligence community, etc.), public records management systems, voting systems, financial services systems, security brokerage systems, and many others. Various embodiments may also improve the function of the Internet of Things, and communication among various IoT devices or among IoT devices and an IoT device controller, such as a router, server, IoT hub, or another similar device. In particular, various embodiments, when implemented in an IoT environment, may be of particular use in preventing distributed denial of service (DDoS) attacks, without human intervention. Various embodiments may also improve the function of remotely controlled, semiautonomous, and autonomous vehicles. Various embodiments may improve the function of a communication system by enabling the performance of a non-repudiable information transaction in which, because the participation of specific computing devices may be authenticated, the authentication procedure may generate evidence creating a presumption that a participant actually participated in the information transaction.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 300, 300a, 300b, 300c, 400, 700, 800, 900, 1000, 1100, 1200, and 1300 may be substituted for or combined with one or more operations of the methods 300, 300a, 300b, 300c, 400, 700, 800, 900, 1000, 1100, 1200, and 1300.

Figure 14:
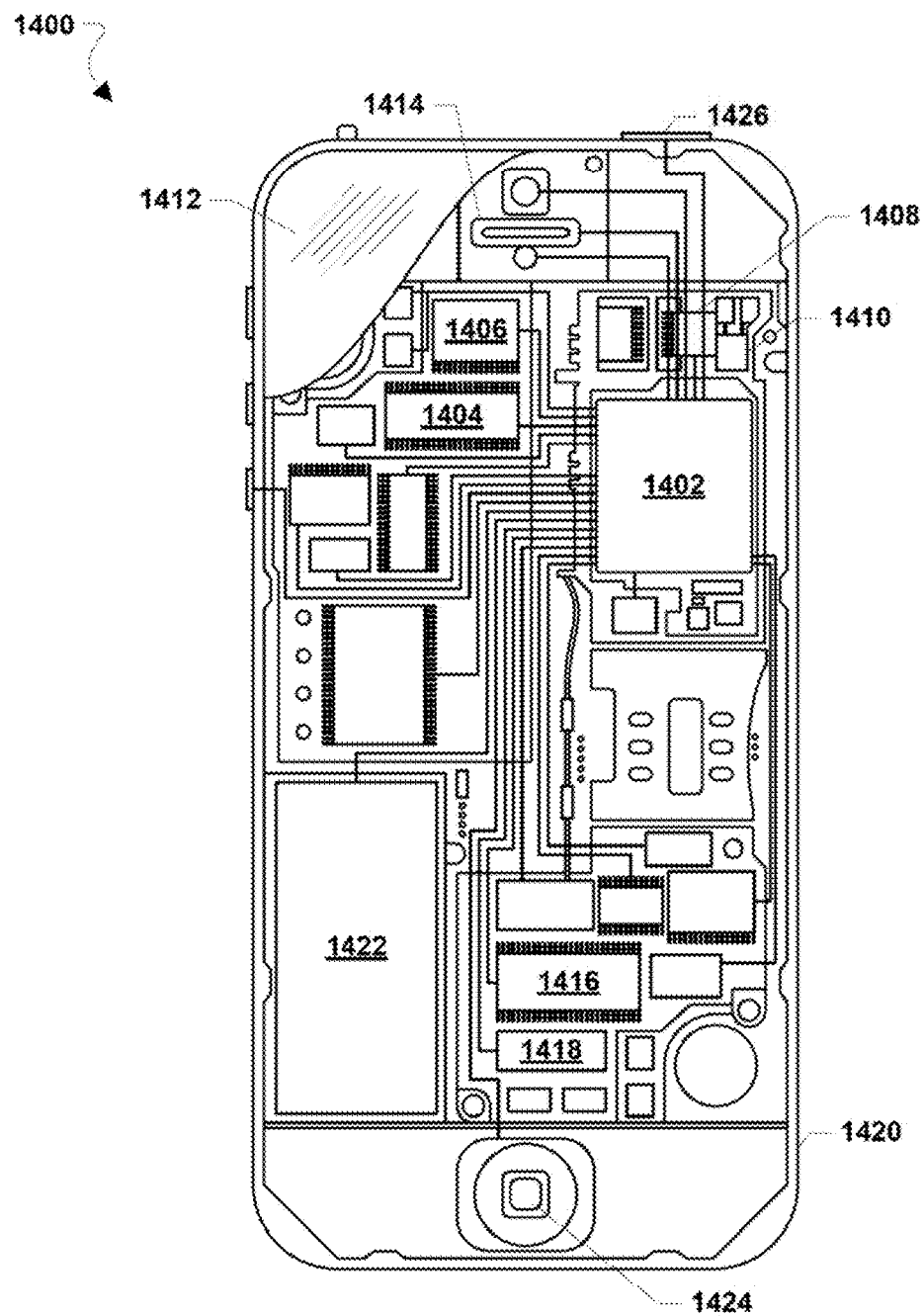
FIG. 14 is a component block diagram of a mobile wireless computing device suitable for implementing various embodiments.

FIG. 14 is a component block diagram of a mobile wireless communication device 1400 suitable for implementing various embodiments. With reference to FIGS. 1A-14, the mobile wireless communication device 1400 may include a processor 1402 coupled to a touchscreen controller 1406 and an internal memory 1404. The processor 1402 may be one or more multi-core integrated circuits designated for general or specific processing tasks. The internal memory 1404 may be volatile or non-volatile memory, and may also be secure and/or encrypted memory, or unsecure and/or unencrypted memory, or any combination thereof. The touchscreen controller 1406 and the processor 1402 may also be coupled to a touchscreen panel 1412, such as a resistive-sensing touchscreen, capacitivesensing touchscreen, infrared sensing touchscreen, etc. Additionally, the display of the mobile wireless communication device 1400 need not have touch screen capability.

The mobile wireless communication device 1400 may have two or more radio signal transceivers 1408 (e.g., Bluetooth, Zigbee, Wi-Fi, radio frequency (RF), etc.) and antennae 1410, for sending and receiving communications, coupled to each other and/or to the processor 1402. The transceivers 1408 and antennae 1410 may be used with the above-mentioned circuitry to implement the various wireless transmission protocol stacks and interfaces. The mobile wireless communication device 1400 may include one or more cellular network wireless modem chip(s) 1416 coupled to the processor and antennae 1410 that enables communication via two or more cellular networks via two or more radio access technologies.

The mobile wireless communication device 1400 may include a peripheral wireless device connection interface 1418 coupled to the processor 1402. The peripheral wireless device connection interface 1418 may be singularly configured to accept one type of connection, or may be configured to accept various types of physical and communication connections, common or proprietary, such as USB, FireWire, Thunderbolt, or PCIe. The peripheral wireless device connection interface 1418 may also be coupled to a similarly configured peripheral wireless device connection port (not shown).

The mobile wireless communication device 1400 may also include speakers 1414 for providing audio outputs. The mobile wireless communication device 1400 may also include a housing 1420, constructed of a plastic, metal, or a combination of materials, for containing all or some of the components discussed herein. The mobile wireless communication device 1400 may include a power source 1422 coupled to the processor 1402, such as a disposable or rechargeable battery. The rechargeable battery may also be coupled to the peripheral wireless device connection port to receive a charging current from a source external to the mobile wireless communication device 1400. The mobile wireless communication device 1400 may also include a physical button 1424 for receiving user inputs. The mobile wireless communication device 1400 may also include a power button 1426 for turning the mobile wireless communication device 1400 on and off.

Figure 15:
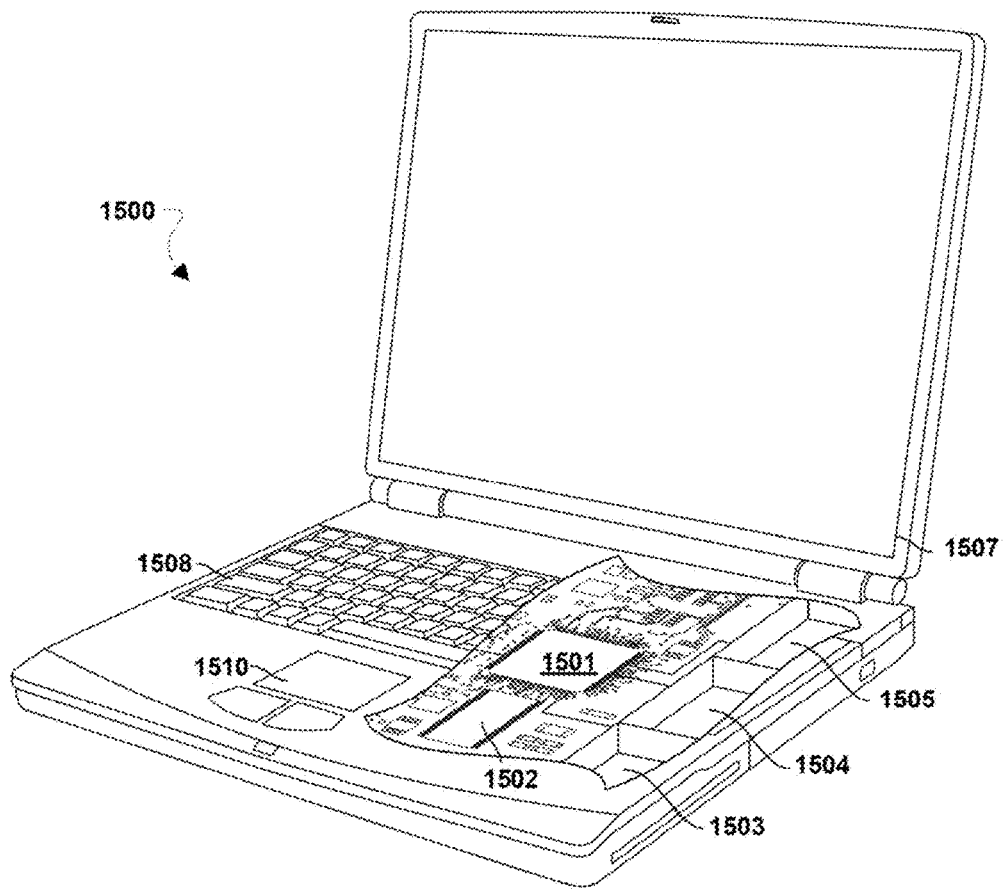
FIG. 15 is a component block diagram of a portable wireless communication device suitable for implementing various embodiments.

Other forms of computing devices may also benefit from the various aspects. Such computing devices typically include the components illustrated in FIG. 15, which illustrates an example laptop computer 1500. With reference to FIGS. 1A-15, the computer 1500 generally includes a processor 1501 coupled to volatile memory 1502 and a large capacity nonvolatile memory, such as a disk drive 1503. The computer 1500 may also include a compact disc (CD) and/or DVD drive 1504 coupled to the processor 1501. The computer 1500 may also include a number of connector ports coupled to the processor 1501 for establishing data connections or receiving external memory devices, such as a network connection circuit 1505 for coupling the processor 1501 to a network. The computer 1500 may also include a display 1507, a keyboard 1508, a pointing device such as a trackpad 1510, and other similar devices.

Figure 16:
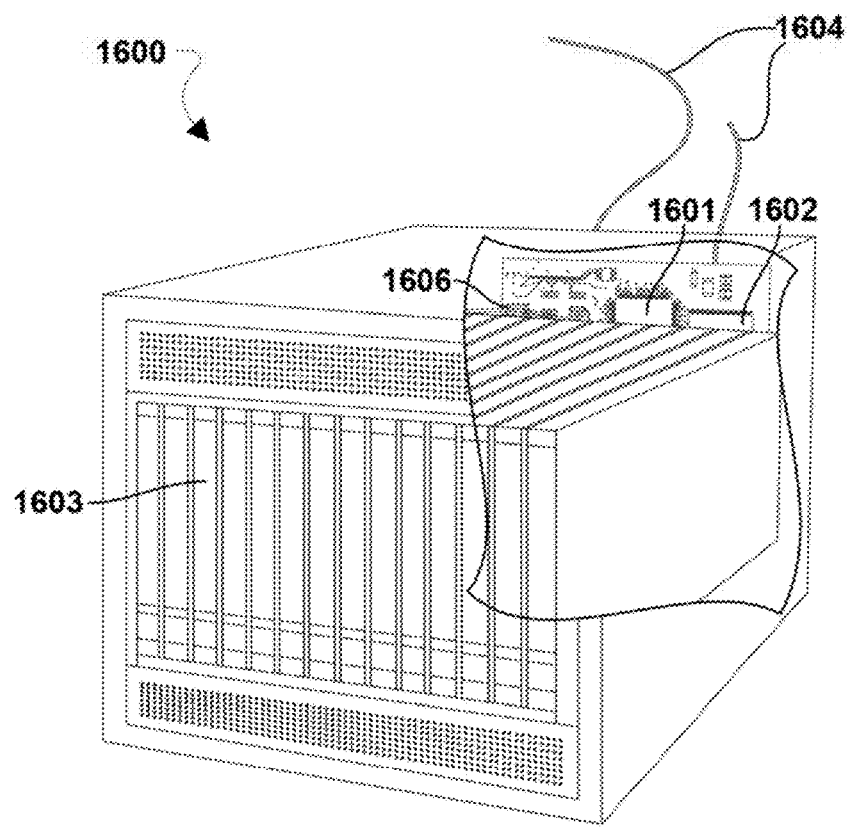
FIG. 16 is a component block diagram of a server device suitable for implementing various embodiments.

Various embodiments may employ a computing device as a network element of a communication network. Such network elements may typically include at least the components illustrated in FIG. 16, which illustrates an example network element, server device 1600. With reference to FIGS. 1A-16, the server device 1600 may typically include a processor 1601 coupled to volatile memory 1602 and a large capacity nonvolatile memory, such as a disk drive 1603. The server device 1600 may also include a peripheral memory access device such as a floppy disc drive, compact disc (CD) or digital video disc (DVD) drive 1606 coupled to the processor 1601. The server device 1600 may also include network access ports 1604 (or interfaces) coupled to the processor 1601 for establishing data connections with a network, such as the Internet and/or a local area network coupled to other system computers and servers. Similarly, the server device 1600 may include additional access ports, such as USB, Firewire, Thunderbolt, and the like for coupling to peripherals, external memory, or other devices.

The processors 1402, 1501, 1601 may be any programmable microprocessor, microcomputer or multiple processor chip or chips that can be configured by software instructions (applications) to perform a variety of functions, including the functions of the various aspects described below. In some mobile devices, multiple processors 1402 may be provided, such as one processor dedicated to wireless communication functions and one processor dedicated to running other applications. Typically, software applications may be stored in the internal memory 1404, 1502, 1602 before they are accessed and loaded into the processor 1402, 1501, 1601. The processor 1402, 1501, 1601 may include internal memory sufficient to store the application software instructions.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process is stored in memory so the process may seamlessly resume its operations when it returns to execution on the processor. This operational state data may include the process's address space, stack space, virtual address space, register set image (e.g., program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavy-weight process that includes multiple lightweight processes or threads, which are processes that share all or portions of their context (e.g., address space, stack, permissions and/or access restrictions, etc.) with other processes/threads. Thus, a single process may include multiple lightweight processes or threads that share, have access to, and/or operate within a single context (i.e., the processor's context).

The foregoing method descriptions and the process flow diagrams are provided merely as illustrative examples and are not intended to require or imply that the blocks of various embodiments must be performed in the order presented. As will be appreciated by one of skill in the art, the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A system for authenticating computing devices, comprising:
　a first computing device, comprising:
　　a first memory; and
　　a first processor configured with processor-executable instructions to perform operations comprising:
　　　selecting first elements from a shared data set stored at the first computing device, wherein the shared data set is also stored at the second computing device;
　　　generating a first rule set for extracting the selected first elements from the shared data set;
　　　transforming the selected first elements to generate a first result; and
　　　sending the first rule set to the second computing device; and
　a second computing device, comprising:
　　a communication interface;
　　a second memory; and
　　a second processor coupled to the communication interface and configured with processor-executable instructions to perform operations comprising:
　　　receiving the first rule set from the first computing device;
　　　extracting the selected first elements from the shared data set stored at the second computing device using the rule set;
　　　transforming the extracted first elements to generate a second result;
　　　sending the generated second result to the first computing device;
　　　selecting second elements from the shared data set stored at the second computing device;
　　　generating a second rule set for extracting the selected second elements from the shared data set; and
　　　sending the second rule set to the first computing device;
　wherein the processor of the first computing device is further configured with processor-executable instructions to perform operations comprising:
　　extracting the selected second elements from the shared data set stored at the first computing device using the second rule set;
　　transforming the extracted second elements to generate a third result;
　　sending the generated third result to the second computing device;
　　determining whether the first result matches the second result; and
　　determining whether the second computing device is authenticated based on whether the first result matches the second result; and
　wherein the processor of the second computing device is further configured with processor-executable instructions to perform operations comprising:
　　transforming the selected second elements to generate a fourth result;
　　determining whether the third result matches the fourth result; and determining whether the first computing device is authenticated based on whether the third result matches the fourth result.

2. The system of claim 1, wherein the processor of the first computing device is configured with processor-executable instructions to perform operations such that the generating a first rule set for extracting the selected first elements from the shared data set is performed prior to the selecting first elements from the shared data set.

3. The system of claim 1, wherein the processor of the first computing device is configured with processor-executable instructions to perform operations further comprising:
sending to the second computing device an indication of whether the second computing device is authenticated based on whether the first result matches the second result.

4. The system of claim 1, wherein the processor of the first computing device is configured with processor-executable instructions to perform operations such that selecting first elements from the shared data set stored at the first computing device, wherein the shared data set is further stored at the second computing device comprises:
selecting one or more portions of the shared data set; and
selecting two or more first elements from among the one or more portions of the shared data set.

5. The system of claim 4, wherein the processor of the first computing device is configured with processor-executable instructions to perform operations such that selecting first elements from the shared data set stored at the first computing device, wherein the shared data set is further stored at the second computing device comprises:
selecting one of the two or more first elements as a primary element.

6. The system of claim 4, wherein the processor of the first computing device is configured with processor-executable instructions to perform operations such that generating a first rule set for extracting the selected elements from the shared data set further comprises:
determining one or more relationships between the selected two or more first elements; and
generating the rule set based on the determined one or more relationships between the selected two or more first elements.

7. The system of claim 1, wherein the processor of the second computing device is configured with processor-executable instructions to perform operations such that extracting the selected first elements from the shared data set stored at the second computing device using the rule set comprises:
identifying one or more first elements of the shared data set indicated in the rule set;
identifying one or more relationships between the selected two or more first elements indicated in the rule set; and
extracting the one or more first elements from the shared data set using the identified one or more first elements and the one or more relationships.

8. The system of claim 1, wherein the shared data set comprises one or more transitory identities.

9. The system of claim 1, wherein the processor of the second computing device is configured with processor-executable instructions to perform operations such that generating a second rule set for extracting the selected second elements from the shared data set is performed prior to the selecting second elements from the shared data set.

10. The system of claim 1, wherein the processor of the second computing device is configured with processor-executable instructions to perform operations further comprising:
sending to the first computing device an indication of whether the first computing device is authenticated based on whether the third result matches the fourth result.

11. The system of claim 1, wherein the processor of the second computing device is configured with processor-executable instructions to perform operations such that selecting second elements from the shared data set stored at the second computing device comprises:
selecting one or more portions of the shared data set; and
selecting two or more second elements from among the one or more portions of the shared data set.

12. The system of claim 11, wherein the processor of the second computing device is configured with processor-executable instructions to perform operations such that selecting second elements from the shared data set stored at the second computing device comprises:
selecting one of the two or more second elements as a primary element.

13. The system of claim 11, wherein the processor of the first computing device is configured with processor-executable instructions to perform operations such that generating a second rule set for extracting the selected second elements from the shared data set further comprises:
determining one or more relationships between the selected two or more second elements; and
generating the rule set based on the determined one or more relationships between the selected two or more second elements.

14. The system of claim 1, wherein the processor of the first computing device is configured with processor-executable instructions to perform operations such that extracting the selected second elements from the shared data set stored at the first computing device using the second rule set comprises:
identifying one or more second elements of the shared data set indicated in the rule set;
identifying one or more relationships between the selected two or more second elements indicated in the rule set; and
extracting the one or more second elements from the shared data set using the identified one or more second elements and the one or more relationships.

15. A method for authenticating computing devices, comprising:
selecting, by a first processor of a first computing device, first elements from a shared data set stored at the first computing device, wherein the shared data set is also stored at a second computing device;
generating, by the first processor, a first rule set for extracting the selected first elements from the shared data set;
transforming, by the first processor, the selected first elements to generate a first result;
sending, by the first processor, the first rule set to the second computing device;
receiving, by a second processor of the second computing device, the first rule set from the first computing device;
extracting, by the second processor, the selected first elements from the shared data set stored at the second computing device using the rule set;
transforming, by the second processor, the extracted first elements to generate a second result;

sending, by the second processor, the generated second result to the first computing device;

selecting, by the second processor, second elements from the shared data set stored at the second computing device;

generating, by the second processor, a second rule set for extracting the selected second elements from the shared data set;

sending, by the second processor, the second rule set to the second computing device;

extracting, by the first processor, the selected second elements from the shared data set stored at the first computing device using the second rule set;

transforming, by the first processor, the extracted second elements to generate a third result;

sending, by the first processor, the generated third result to the second computing device;

determining, by the first processor, whether the first result matches the second result;

determining, by the first processor, whether the second computing device is authenticated based on whether the first result matches the second result;

transforming, by the second processor, the selected second elements to generate a fourth result;

determining, by the second processor, whether the third result matches the fourth result; and determining, by the second processor, whether the first computing device is authenticated based on whether the third result matches the fourth result.

16. A non-transitory processor-readable storage medium having stored thereon processor-executable instructions configured to cause a processor of a computing device to perform operations for authenticating computing devices, comprising:

selecting, by a first processor of a first computing device, first elements from a shared data set stored at the first computing device, wherein the shared data set is also stored at a second computing device;

generating, by the first processor, a first rule set for extracting the selected first elements from the shared data set;

transforming, by the first processor, the selected first elements to generate a first result; and sending, by the first processor, the first rule set to the second computing device;

receiving, by a second processor of the second computing device, the first rule set from the first computing device;

extracting, by the second processor, the selected first elements from the shared data set stored at the second computing device using the rule set;

transforming, by the second processor, the extracted first elements to generate a second result;

sending, by the second processor, the generated second result to the first computing device;

selecting, by the second processor, second elements from the shared data set stored at the second computing device;

generating, by the second processor, a second rule set for extracting the selected second elements from the shared data set;

sending, by the second processor, the second rule set to the second computing device;

extracting, by the first processor, the selected second elements from the shared data set stored at the first computing device using the second rule set;

transforming, by the first processor, the extracted second elements to generate a third result;

sending, by the first processor, the generated third result to the second computing device;

determining, by the first processor, whether the first result matches the second result;

determining, by the first processor, whether the second computing device is authenticated based on whether the first result matches the second result;

transforming, by the second processor, the selected second elements to generate a fourth result;

determining, by the second processor, whether the third result matches the fourth result; and determining, by the second processor, whether the first computing device is authenticated based on whether the third result matches the fourth result.

* * * * *